United States Patent
Maeda

(10) Patent No.: US 12,539,797 B2
(45) Date of Patent: Feb. 3, 2026

(54) VEHICLE SEAT AIR-CONDITIONING DEVICE

(71) Applicant: Panasonic Intellectual Property Management Co., Ltd., Osaka (JP)

(72) Inventor: Yoshihiko Maeda, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 158 days.

(21) Appl. No.: 18/333,321

(22) Filed: Jun. 12, 2023

(65) Prior Publication Data

US 2023/0311728 A1 Oct. 5, 2023

Related U.S. Application Data

(63) Continuation of application No. PCT/JP2021/037456, filed on Oct. 8, 2021.

(30) Foreign Application Priority Data

Dec. 23, 2020 (JP) .................. 2020-213597
Dec. 23, 2020 (JP) .................. 2020-213638
Jun. 9, 2021 (JP) .................. 2021-096865

(51) Int. Cl.
*B60N 2/56* (2006.01)

(52) U.S. Cl.
CPC .......... *B60N 2/5657* (2013.01); *B60N 2/565* (2013.01); *B60N 2/5678* (2013.01)

(58) Field of Classification Search
CPC ...... B60N 2/5657; B60N 2/56; B60N 2/5628; B60N 2/5635; B60N 2/5642; B60N 2/565
See application file for complete search history.

(56) References Cited

U.S. PATENT DOCUMENTS 6,105,667 A * 8/2000 Yoshinori ............ B60N 2/5657
                                                           219/202
8,256,236 B2 * 9/2012 Lofy ...................... F28D 15/00
                                                           62/3.61

(Continued)

FOREIGN PATENT DOCUMENTS

CN    110126580 A    8/2019
JP    2008074278 A   4/2008

(Continued)

OTHER PUBLICATIONS

International search Report and Written Opinion, mailed Nov. 16, 2021, for International Patent Application No. PCT/JP2021/037456. (10 pages) (with English Translation of Search Report only).

(Continued)

*Primary Examiner* — Shin H Kim
(74) *Attorney, Agent, or Firm* — Seed Intellectual Property Law Group LLP

(57) ABSTRACT

A vehicle seat air-conditioning device includes: a blower that is included in a seat; at least one of an inlet duct or an outlet duct, the inlet duct being a duct through which air is led to be drawn in from a surface of the seat by the blower, and the outlet duct being a duct through which the air led by the blower is discharged from a surface of the seat; and a controller that is electrically connected to the blower. The blower includes a current detection circuit that detects a current consumption of the blower. The controller determines whether an occupant is sitting on the seat, based on the current consumption detected by the current detection circuit.

18 Claims, 10 Drawing Sheets

(56) References Cited

U.S. PATENT DOCUMENTS

| | | | | |
|---|---|---|---|---|
| 8,505,320 B2* | 8/2013 | Lofy | ............ | B60N 2/5692 |
| | | | | 62/3.61 |
| 10,569,616 B2* | 2/2020 | Tanaka | ............ | B60H 1/00285 |
| 10,766,336 B2* | 9/2020 | Fujii | ............ | B60H 1/0055 |
| 10,773,615 B2* | 9/2020 | McElroy | ............ | B60H 1/00285 |
| 11,027,631 B2* | 6/2021 | Hoshi | ............ | B60N 2/682 |
| 11,535,131 B1* | 12/2022 | Feltham | ............ | B60N 2/5628 |
| 2002/0092308 A1* | 7/2002 | Bell | ............ | B60N 2/5657 |
| | | | | 62/3.7 |
| 2005/0093347 A1* | 5/2005 | Bajic | ............ | B60N 2/5635 |
| | | | | 297/180.13 |
| 2006/0254284 A1* | 11/2006 | Ito | ............ | B60N 2/5635 |
| | | | | 62/3.61 |
| 2006/0272337 A1* | 12/2006 | Ito | ............ | B60N 2/5635 |
| | | | | 62/3.61 |
| 2007/0095378 A1* | 5/2007 | Ito | ............ | H10N 10/17 |
| | | | | 136/203 |
| 2008/0318467 A1* | 12/2008 | Denomme | ............ | H01R 31/08 |
| | | | | 439/511 |
| 2009/0051226 A1* | 2/2009 | Marukawa | ............ | B60L 3/0069 |
| | | | | 307/328 |
| 2009/0079236 A1* | 3/2009 | Itou | ............ | B60N 2/5642 |
| | | | | 297/180.1 |
| 2009/0193814 A1* | 8/2009 | Lofy | ............ | B60N 2/5657 |
| | | | | 62/3.61 |
| 2011/0186560 A1* | 8/2011 | Kennedy | ............ | B60N 2/5657 |
| | | | | 219/217 |
| 2012/0319439 A1* | 12/2012 | Lofy | ............ | B60N 2/5685 |
| | | | | 219/217 |
| 2013/0137354 A1 | 5/2013 | Tsuzaki et al. | | |
| 2018/0117987 A1* | 5/2018 | Yamaoka | ............ | B60N 2/5657 |
| 2018/0154793 A1* | 6/2018 | Jun | ............ | B60H 1/00778 |
| 2019/0241043 A1 | 8/2019 | Ito et al. | | |
| 2019/0351735 A1 | 11/2019 | Kawano et al. | | |
| 2020/0031257 A1* | 1/2020 | Okimura | ............ | B60N 2/5635 |
| 2020/0093635 A1* | 3/2020 | Kakizaki | ............ | B60N 2/5671 |
| 2020/0361350 A1* | 11/2020 | Hoshi | ............ | B60N 2/5657 |

FOREIGN PATENT DOCUMENTS

| | | |
|---|---|---|
| JP | 5146050 B2 | 2/2013 |
| JP | 2013111987 A | 6/2013 |
| JP | 2018131005 A | 8/2018 |

OTHER PUBLICATIONS

Notice of Reasons for Refusal, dated Mar. 18, 2025, for Japanese Patent Application No. 2021-096865. (17 pages) (with English Translation).

Office Action dated Jun. 24, 2025, for Chinese Patent Application No. 202180084383.3. (10 pages) (With English Machine Translation).

Search Report dated Jun. 24, 2025, for Chinese Patent Application No. 202180084383.3. (4 pages) (With English Machine Translation).

* cited by examiner

VEHICLE SEAT AIR-CONDITIONING DEVICE

CROSS REFERENCE TO RELATED APPLICATIONS

This is a continuation application of PCT International Application No. PCT/JP2021/037456 filed on Oct. 8, 2021, designating the United States of America, which is based on and claims priority of Japanese Patent Applications No. 2020-213597 filed on Dec. 23, 2020, No. 2020-213638 filed on Dec. 23, 2020, and No. 2021-096865 filed on Jun. 9, 2021.

FIELD

The present disclosure relates to a vehicle seat air-conditioning device that blows air on an occupant sitting on a seat.

BACKGROUND

Patent Literature (PTL) 1 discloses a conventional vehicle seat air-conditioning device. This vehicle seat air-conditioning device includes: an air-conditioning device that is provided for a seat of a vehicle; an occupant detector that detects an occupant sitting on the seat; an air duct through which air led by the air-conditioning device is led to a plurality of outlets; and an air-conditioning controller that performs control by switching an operation mode between: a normal mode used when the occupant is detected; and a limited mode which is used when the occupant is not detected and in which operation output is limited as compared with the normal mode.

CITATION LIST

Patent Literature

PTL 1: Japanese Patent No. 5146050

SUMMARY

However, the conventional vehicle seat air-conditioning device according to PTL1 can be improved upon.

The vehicle seat air-conditioning device according to one aspect of the present disclosure is capable of improving upon the above related art.

In accordance with an aspect of the present disclosure, a vehicle seat air-conditioning device includes: a blower that is included in a seat; at least one of an inlet duct or an outlet duct, the inlet duct being a duct through which air is led to be drawn in from a surface of the seat by the blower, and the outlet duct being a duct through which the air led by the blower is discharged from a surface of the seat; and a controller that is electrically connected to the blower, wherein the blower includes a current detection circuit that detects a current consumption of the blower, and the controller determines whether an occupant is sitting on the seat, based on the current consumption detected by the current detection circuit.

Note that this general and specific aspect may be implemented using any combination of systems, methods, and integrated circuits.

The vehicle seat air-conditioning device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
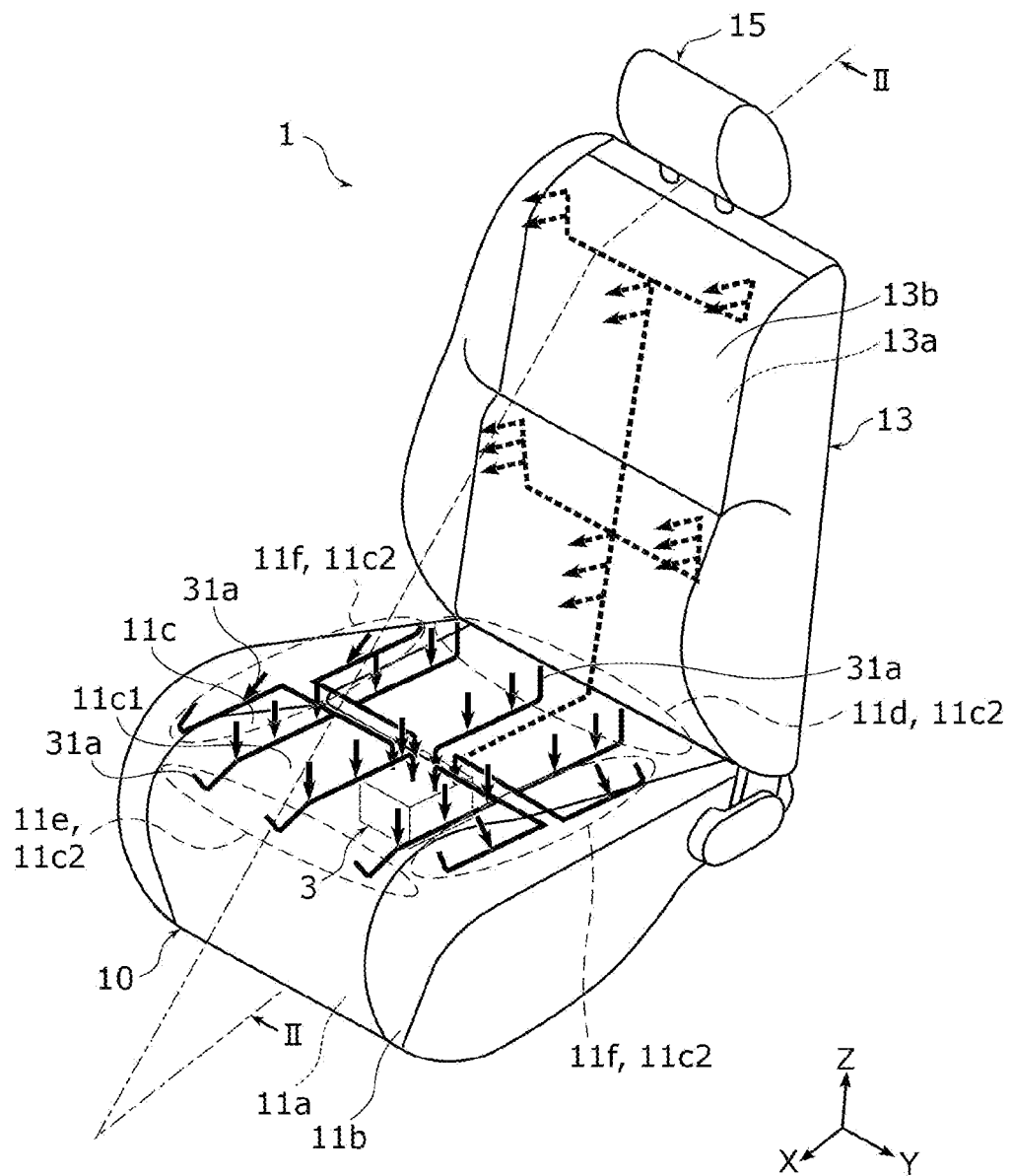
FIG. 1 is an external perspective view of a seat provided with a vehicle seat air-conditioning device according to Embodiment 1.

To detect the occupant sitting on the seat, the conventional vehicle seat air-conditioning device needs to include an occupant detection sensor or the like as the occupant detector. This makes the vehicle seat air-conditioning device complex in configuration. In accordance with an aspect of the present disclosure, a vehicle seat air-conditioning device includes: a blower that is included in a seat; at least one of an inlet duct or an outlet duct, the inlet duct being a duct through which air is led to be drawn in from a surface of the seat by the blower, and the outlet duct being a duct through which the air led by the blower is discharged from a surface of the seat; and a controller that is electrically connected to the blower, wherein the blower includes a current detection circuit that detects a current consumption of the blower, and the controller determines whether an occupant is sitting on the seat, based on the current consumption detected by the current detection circuit.

For example, if an inlet of the inlet duct or an outlet of the outlet duct is covered by the occupant sitting on the seat, the amount of air passing through the inlet or the outlet is likely to decrease. When the revolution speed of the blower is constant, the decreased amount of air passing through the inlet or the outlet causes the current consumption of the blower to decrease as well. This is because a workload of the blower is reduced by decrease in atmospheric pressure between the blower and the covered inlet or outlet, or more specifically, by decrease in resistance between the air and a propeller of the blower.

In response, the present disclosure focuses on such characteristics. The controller can determine whether the occupant is sitting on the seat, depending on a small or large amount of current consumption detected by the current detection circuit through the control over the blower. For example, if the current consumption detected by the current detection circuit is smaller than the current consumption detected when the occupant is not sitting on the seat, the controller determines that the occupant is sitting on the seat.

Thus, this vehicle seat air-conditioning device is capable of detecting seat occupancy by the occupant with a simple configuration.

In particular, unlike the conventional vehicle seat air-conditioning device, the seat occupancy by the occupant can be detected without an additional sensor. This can keep production costs of the vehicle seat air-conditioning device from rising.

In the vehicle seat air-conditioning device accordance with the aspect of the present disclosure, it is possible that, in the determination, when the current consumption is smaller than a first threshold value, the controller determines that the occupant is sitting on the seat.

With this, if the current consumption is smaller than the first threshold value, or more specifically, if the current consumption is smaller than the current consumption detected when the occupant is not sitting on the seat, the controller determines that the occupant is sitting on the seat. Accurate determination of whether the occupant is sitting on the seat allows the controller to control the blower. This can reduce the current consumption of the blower in the absence of the occupant.

In the vehicle seat air-conditioning device accordance with the aspect of the present disclosure, it is possible that, when the controller determined that the occupant is sitting on the seat, the controller controls the blower so that a revolution speed of the blower becomes equal to a steady revolution speed.

With this, if the occupant is sitting on the seat, the controller can stabilize the revolution speed of the blower at the steady revolution speed by maintaining electric power supplied to the blower constant. Thus, a more appropriate amount of air blown on the occupant provides the occupant with more comfort.

In the vehicle seat air-conditioning device accordance with the aspect of the present disclosure, it is possible that, in the determining, when the current consumption is greater than or equal to the first threshold value, the controller determines that the occupant is not sitting on the seat, and when the controller determined that the occupant is not sitting on the seat, the controller controls the blower so that the revolution speed of the blower becomes lower than the revolution speed provided when it is determined that the occupant is sitting on the seat.

With this, if the occupant is not sitting on the seat, the controller can control the blower by reducing the electric power supplied to the blower. This can reduce the power consumption to save energy.

In the vehicle seat air-conditioning device accordance with the aspect of the present disclosure, it is possible that, by driving the blower when the vehicle is in non-use or when a door of the vehicle in non-use is unlocked, the controller updates the first threshold value to the current consumption detected by the current detection circuit.

With this, even if the seat or the blower deteriorates over time, the current consumption updated as the first threshold value ensures accurate determination of whether the occupant is sitting on the seat.

The vehicle seat air-conditioning device accordance with the aspect of the present disclosure may further include a voltage detection circuit that detects a drive voltage of the blower. The controller corrects the current consumption of the blower, based on the drive voltage detected by the voltage detection circuit.

With this, the current consumption can be corrected, by previously measuring the current consumption of the blower based on a change in the applied voltage. Thus, even if the applied voltage changes due to deterioration of a battery for example, whether the occupant is sitting on the seat can be more accurately determined.

The vehicle seat air-conditioning device accordance with the aspect of the present disclosure may further include a voltage detection circuit that detects a drive voltage of the blower. The controller corrects the first threshold value, based on the drive voltage detected by the voltage detection circuit.

With this, the first threshold value can also be corrected, by previously measuring the current consumption of the blower based on a change in the applied voltage. Thus, even if the applied voltage changes due to deterioration of a battery for example, whether the occupant is sitting on the seat can be more accurately determined.

In the vehicle seat air-conditioning device accordance with the aspect of the present disclosure, it is possible that the current detection circuit further serves as an overcurrent detection circuit of the blower.

With this, the current detection circuit can detect an overcurrent of the blower without an overcurrent detection circuit separately added to the blower. Alternatively, the current detection circuit can be implemented by an overcurrent detection circuit originally included in the blower. This can keep the configuration of the vehicle seat air-conditioning device from increasing in complexity and also keep production costs of the vehicle seat air-conditioning device from rising.

In the vehicle seat air-conditioning device accordance with the aspect of the present disclosure, it is possible that, when the current consumption exceeds an upper limit, the controller outputs a warning signal to an external device.

If the current consumption exceeds the preset upper limit as above, the blower may have a failure or may be controlled at a revolution speed higher than normal. Thus, a failure of the blower, clogging of the inlet duct or the outlet duct, or deterioration of a cushion can be expected. The occupant can be informed about replacement or cleaning of the blower or about replacement of the cushion. This allows the occupant to keep the seat in an appropriate state.

In the vehicle seat air-conditioning device accordance with the aspect of the present disclosure, it is possible that the inlet duct is provided in each of a center portion and an outer edge portion of a seating surface which is a seating side of the seat and on which the occupant sits.

With this, between the seating surface and the buttocks and thighs, the air drawn in from the inlet of the inlet duct provided in the center portion of the seating surface can prevent the buttocks and thighs of the person from being sweaty. Furthermore, the inlet of the inlet duct provided in the outer edge portion of the seating surface is less likely to be covered by the buttocks and thighs of the person and thus can draw in the air around the seat. For example, if the inlet of the inlet duct provided in the center portion of the seating surface is unable to draw in the air, the inlet of the inlet duct provided in the outer edge portion of the seating surface is able to draw in the air. Thus, the air can be discharged from the outlet.

In the vehicle seat air-conditioning device accordance with the aspect of the present disclosure, it is possible that the outer edge portion is at least one of a rear portion or a front edge portion of the seating surface.

With this, especially the rear portion and the front edge portion of the outer edge portion of the seating surface are even less likely to be covered by the buttocks and thighs of the person. This increases the accuracy of air suction from the inlet.

In the vehicle seat air-conditioning device accordance with the aspect of the present disclosure, it is possible that the controller controls a revolution speed of the blower, based on the current consumption detected by the current detection circuit.

For example, if an inlet of the inlet duct or an outlet of the outlet duct is covered by the occupant sitting on the seat, the amount of air passing through the inlet or the outlet is likely to decrease. When the revolution speed of the blower is constant, the decreased amount of air passing through the inlet or the outlet causes the current consumption of the blower to decrease as well. This is because a workload of the blower is reduced by decrease in atmospheric pressure between the blower and the covered inlet or outlet, or more specifically, by decrease in resistance between the air and a propeller of the blower.

If the current consumption detected by the current detection circuit is small, this is because at least one of the inlet or the outlet is covered by the occupant with large body size and thus the amount of air passing through the inlet or the outlet decreases as compared with the case where the occupant with average body size is sitting on the seat. If the current consumption detected by the current detection circuit is large, this is because at least one of the inlet or the outlet is covered by the occupant with small body size and thus the amount of air passing through the inlet or the outlet increases as compared with the case where the occupant with average body size is sitting on the seat.

Here, if the current consumption detected is smaller than the current consumption detected when the occupant with average body size is sitting on the seat, the amount of air from the blower decreases. In response, the controller according to the present disclosure can perform control to increase the revolution speed of the blower. Furthermore, if the current consumption detected is larger than the current consumption detected when the occupant with average body size is sitting on the seat, the amount of air from the blower increases. In response, the controller can perform control to decrease the revolution speed of the blower.

Thus, this vehicle seat air-conditioning device can provide the occupant with comfort by blowing an appropriate amount of air on the occupant.

In the vehicle seat air-conditioning device accordance with the aspect of the present disclosure, it is possible that the controller controls the blower so that the smaller the current consumption is than a second threshold value, the higher the revolution speed is, and that the controller controls the blower so that the greater the current consumption is than the second threshold value, the lower the revolution speed is.

With this, the controller can control the blower to increase the revolution speed along with decrease of the current consumption from the current consumption detected when the occupant with average body size is sitting on the seat. Furthermore, the controller can control the blower to decrease the revolution speed along with increase of the current consumption from the current consumption detected when the occupant with average body size is sitting on the seat. Thus, a more appropriate amount of air blown on the occupant can provide the occupant with more comfort.

In the vehicle seat air-conditioning device accordance with the aspect of the present disclosure, it is possible that the controller controls the blower so that a constant amount of air is discharged from the surface of the seat regardless of a state of the occupant sitting on the seat.

With this, regardless of the body size or the posture that indicates the state of the occupant, the constant amount of air can be discharged from the surface of the seat. Thus, a more appropriate amount of air blown on the occupant can provide the occupant with more comfort.

In the vehicle seat air-conditioning device accordance with the aspect of the present disclosure, it is possible that the controller determines, based on the current consumption, a body size of the occupant sitting on the seat, and outputs a signal indicating the body size of the occupant as a determination result to an external device.

With this, if the current consumption detected by the current detection circuit is small, the controller determines that the occupant with large body size is sitting on the seat. Furthermore, if the current consumption detected by the current detection circuit is large, the controller determines that the occupant with small body size is sitting on the seat.

Furthermore, the controller can output the signal indicating the body size of the occupant to the external device. If the external device is a vehicle electronic control unit (vehicle ECU) for instance, the vehicle ECU receives the signal indicating the body size of the occupant and thereby can control the orientation of an imaging device so that the imaging device faces the direction in which the face of the occupant is assumed to be located.

In the vehicle seat air-conditioning device accordance with the aspect of the present disclosure, it is possible that the controller determines, based on a change in the current consumption, whether a posture of the occupant sitting on the seat has changed, and outputs a signal indicating the change in the posture of the occupant as a determination result to the external device.

With this, if the amount of change in the current consumption detected by the current detection circuit is large, the controller determines that the posture of the occupant is relaxed. Furthermore, if the amount of change in the current consumption detected by the current detection circuit is small, the controller determines that the occupant is sitting up straight on the seat.

Furthermore, if the external device is a vehicle ECU for instance, the vehicle ECU can control the orientation of an imaging device based on the signal indicating the posture of the occupant so that the imaging device faces the direction in which the face of the occupant is assumed to be located.

The vehicle seat air-conditioning device in accordance with the aspect of the present disclosure further includes: a voltage detection circuit that detects a drive voltage of the blower. The controller corrects a second threshold value corresponding to the current consumption of the blower, based on the drive voltage detected by the voltage detection circuit.

With this, the second threshold value can also be corrected, by previously measuring the current consumption of the blower based on a change in the applied voltage. Thus, even if the applied voltage changes due to deterioration of a battery for example, the body size or the posture of the occupant can be more accurately determined based on the current consumption.

In the vehicle seat air-conditioning device accordance with the aspect of the present disclosure, it is possible that, by driving the blower when the vehicle is in non-use or when a door of the vehicle in non-use is unlocked, the controller corrects a correlation between the current consumption and the revolution speed, the correlation being used for controlling the revolution speed based on the current consumption detected by the current detection circuit.

In this way, even if the seat or the blower deteriorates over time, the corrected correlation enables the constant amount of air to be provided.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures. It should also be noted that the following embodiments may include expressions using "substantially", such as substantially rectangular. For example, substantially rectangular means not only completely rectangular but also practically rectangular. For example, substantially rectangular includes a difference of about several % from completely rectangular. The other expressions using "substantially" have the same meaning.

In the following description, an X-axis direction refers to the forward-backward direction of the seat and a Z-axis direction refers to the upward-downward direction. Furthermore, a Y-axis direction refers to the rightward-leftward direction, or more specifically, the direction perpendicular to both the X-axis direction and the Z-axis direction. The forward side of the seat in the X-axis direction is referred to as the positive side in the X-axis direction. The backward side of the seat in the X-axis direction is referred to as the negative side in the X-axis direction. Furthermore, the leftward side of the seat in the Y-axis direction (the right forward side as viewed in FIG. 1) is referred to as the positive side in the Y-axis direction. The opposite side of the seat in the Y-axis direction is referred to as the negative side in the Y-axis direction. Here, the rightward side is defined with respect to an occupant who is sitting on the seat and facing in the traveling direction of the vehicle, and thus is the Y-axis negative direction. The leftward side is defined with respect to the occupant who is sitting on the seat and facing in the traveling direction of the vehicle, and thus is the Y-axis positive direction. Furthermore, the upward side of the seat in the Z-axis direction is referred to as the positive side in the Z-axis direction. The downward side of the seat in the Z-axis direction is referred to as the negative side in the Z-axis direction. These terms are equally used for FIG. 2 and subsequent figures.

The following describes Embodiment in detail, with reference to the drawings.

Embodiment 1

<Configuration: Seat 1>

Figure 2:
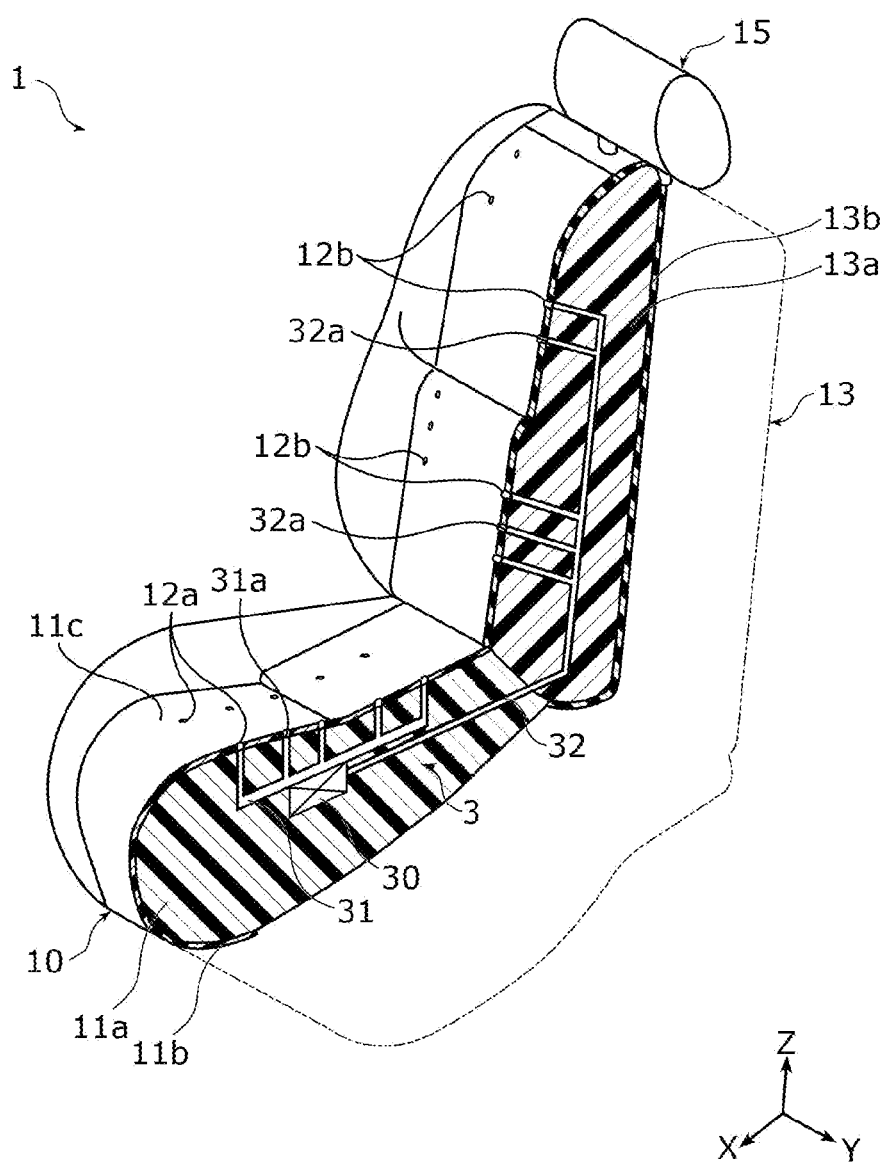
FIG. 2 is a diagram illustrating an external perspective view of the seat provided with the vehicle seat air-conditioning device, together with a cross-sectional view of the seat taken along line II-II in FIG. 1.
Figure 3:
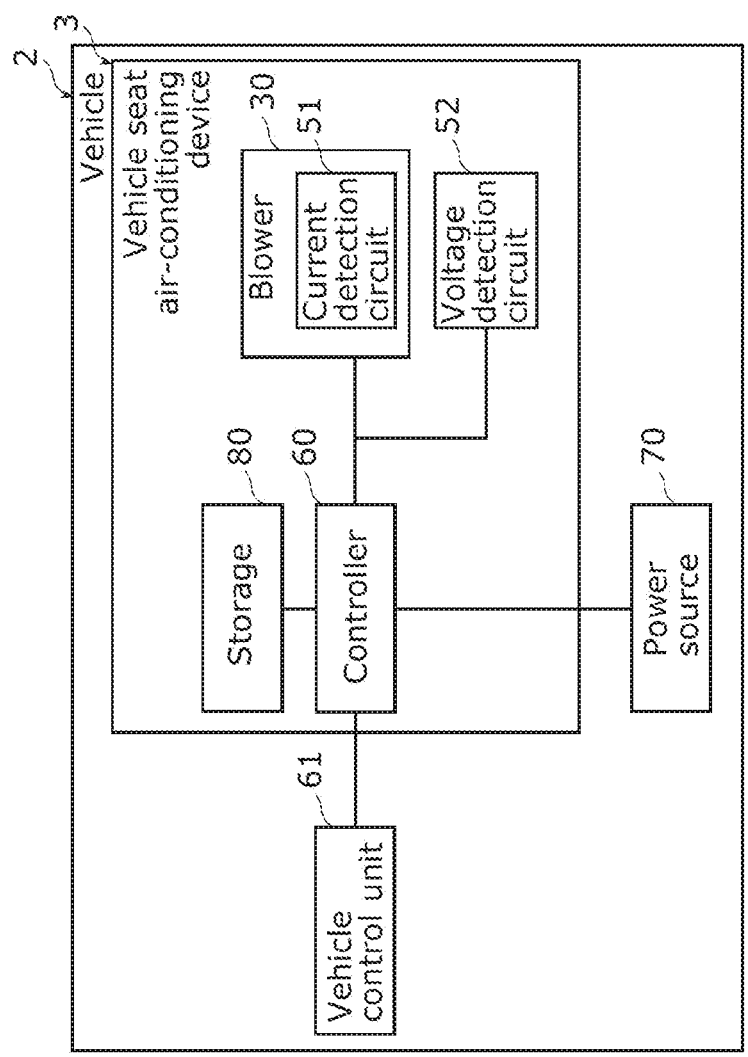
FIG. 3 is a block diagram illustrating a vehicle that includes the vehicle seat air-conditioning device according to Embodiment 1.

FIG. 1 is an external perspective view of seat 1 provided with vehicle seat air-conditioning device 3 according to Embodiment 1. FIG. 2 is a diagram illustrating an external perspective view of seat 1 provided with vehicle seat air-conditioning device 3, together with a cross-sectional view of seat 1 taken along line II-II in FIG. 1. FIG. 3 is a block diagram illustrating vehicle 2 that includes vehicle seat air-conditioning device 3 according to Embodiment 1.

As illustrated in FIG. 1 to FIG. 3, seat 1 included in, for instance, vehicle 2 cools or warms an occupant sitting on seat 1 by blowing air on the occupant. Seat 1 is capable of cooling or warming the body of the occupant by blowing air on the head, neck, shoulders, back, waist, buttocks, and thighs of the occupant sitting on seat 1. In the present embodiment, air is drawn in from seating surface 11c that is included in seat 1 and corresponds to the buttocks and thighs. Then, the air is discharged from a front surface that is included in seat back 13 of seat 1 and that corresponds to the shoulders, back, and waist (this front surface is opposite to the occupant sitting on seat 1). In this way, an airflow is generated. Note that air may be drawn in from the front surface of seat back 13 and discharged from seating surface 11c of seat 1. Alternatively, air may be drawn in from a position other than seating surface 11c of seat 1, such as an undersurface, a right-hand side surface, or a left-hand side surface of seat base 10 of seat 1, or a rear side surface, a right-hand side surface, or a left-hand side surface of seat back 13, and then may be discharged from the front surface of seat back 13 or seating surface 11c of seat 1. Thus, an inlet position and an outlet position of vehicle seat air-conditioning device 3 are not limited to those described in the present embodiment. On this account, the view illustrated in FIG. 1 for instance is merely an example and this example illustrated in FIG. 1 for instance is not intended to be limiting.

Seat 1 described above includes seat base 10 on which the occupant sits, seat back 13, headrest 15, vehicle seat air-conditioning device 3, and power source 70.

[Seat Base 10]

As illustrated in FIG. 1 and FIG. 2, seat base 10 is a seat cushion that supports the buttocks and thighs of the occupant sitting on seat 1. Seat base 10 includes: first seat pad 11a that corresponds to a cushion; and first seat cover 11b that covers first seat pad 11a.

First seat pad 11a is made of urethane foam for example, and is included in a seat base body. First seat pad 11a has a thick, substantially rectangular board-like structure, and is disposed substantially parallel to the X-Y plane. First seat pad 11a supports the buttocks and thighs of the sitting occupant.

First seat pad 11a includes inlet duct 31 through which air is led to be drawn in from first vent 12a of seating surface 11c, which is a surface of first seat cover 11b on the positive side in the Z-axis direction. Furthermore, first seat pad 11a includes inlet duct 31, a part of outlet duct 32, and blower 30 that are components of vehicle seat air-conditioning device 3. To be more specific, each of these components is fixed to a spring disposed directly under first seat pad 11a. Note that the spring is not shown in FIG. 2. The fixing of the components of seat air-conditioning device 3 to the spring is not intended to be limiting. These components may be fixed to a seat frame disposed at a front portion of first seat pad 11a. Activation of blower 30 causes air to flow into inlet duct 31 of first seat pad 11a.

First seat cover 11b covers first seat pad 11a. For example, first seat cover 11b is a leather cover or a fiber cover.

First seat cover 11b includes first vent 12a from which air is drawn in. First vent 12a is provided on seating surface 11c which is a seating side of seat base 10 and on which the occupant sits (that is, the surface on the positive side in the Z-axis direction). First vent 12a is provided at a position corresponding to inlet 31a of vehicle seat air-conditioning device 3. In the present embodiment, a plurality of first vents 12a of first seat cover 11b are arranged along the X-axis direction and also arranged in a plurality of rows in the Y-axis direction. In FIG. 1, the solid arrows indicate first vents 12a.

Air drawn in from first vent 12a is drawn in from inlet 31a of vehicle seat air-conditioning device 3 and then led through inlet duct 31. On this account, first vent 12a also serves as an inlet that draws in air flowing above seating surface 11c by convection, under suction from inlet 31a as a result of the activation of vehicle seat air-conditioning device 3. First vent 12a may be a part of inlet duct 31.

[Seat Back 13]

Seat back 13 is a backrest that supports the shoulders, back, and waist of the occupant sitting on seat 1. Seat back 13 is long in the Z-axis direction and disposed to sit up with respect to seat base 10. Seat back 13 includes: second seat pad 13a that corresponds to a cushion; and second seat cover 13b that covers second seat pad 13a.

Second seat pad 13a is made of urethane foam for example, and has a structure in a lower part of seat back 13 to adjust, according to a posture, a backrest angle with respect to the Y axis as the center. Second seat pad 13a supports the shoulders, back, and waist of the sitting occupant.

Second seat pad 13a includes a part of outlet duct 32 provided for discharging air drawn in from first vent 12a. Air led through inlet duct 31 of first seat pad 11a as a result of the activation of blower 30 is discharged from outlet 32a of outlet duct 32.

Second seat cover 13b covers second seat pad 13a. For example, second seat cover 13b is a leather cover or a fiber cover.

Second seat cover 13b includes a plurality of second vents 12b provided for discharging the drawn-in air. Second vent 12b is provided on a surface opposite to the occupant sitting on seat base (that is, the surface on the positive side in the X-axis direction). Second vent 12b is provided at a position corresponding to outlet 32a of outlet duct 32. In the present embodiment, second seat cover 13b includes the plurality of second vents 12b. In FIG. 1, the dashed arrows indicate outlet duct 32. The plurality of second vents 12b are provided at positions corresponding to the back, waist, both arms, both sides, and both shoulders of the occupant.

Air led through inlet duct 31 and outlet duct 32 as a result of the activation of vehicle seat air-conditioning device 3 and then discharged from outlet 32a passes through the plurality of second vents 12b. On this account, second vent 12b also serves as an outlet through which air is discharged to the outside of seat 1. Second vent 12b may be a part of outlet duct 32.

[Headrest 15]

Headrest 15 is a head supporter that supports the head of the occupant sitting on seat 1. Headrest 15 is fixed to an end part of seat back 13 on the positive side in the Z-axis direction.

Note that some of the plurality of second vents 12b may be provided in headrest 15. To be more specific, a part of outlet duct 32 may be provided in headrest 15.

[Vehicle Seat Air-Conditioning Device 3]

Vehicle seat air-conditioning device 3 is included in seat 1 and capable of blowing air on the occupant sitting on seat 1 from behind the occupant. To blow air, vehicle seat air-conditioning device 3 draws in air flowing around seat 1 by convection and then discharges the drawn-in air. Thus, the air blown is warm if a temperature around seat 1 is higher than ordinary temperature and is cool if the temperature is lower than ordinary temperature. Note that vehicle seat air-conditioning device 3 may include an air conditioner capable of heating and cooling.

As illustrated in FIG. 2 and FIG. 3, vehicle seat air-conditioning device 3 includes blower 30, inlet duct 31, outlet duct 32, voltage detection circuit 52, controller 60, and storage 80. The present embodiment describes an example of vehicle seat air-conditioning device 3 that includes inlet duct 31 and outlet duct 32. However, vehicle seat air-conditioning device 3 may include only at least one of outlet duct 31 or outlet duct 32.

Blower 30 is capable of drawing in air from first vent 12a provided in first seat cover 11b of seat 1, and discharging the drawn-in air from second vent 12b provided in second seat pad 13a. To be more specific, blower 30 is electrically connected to controller 60. Under the drive control of controller 60, blower 30 draws in air from inlet 31a via first vent 12a and discharges, from second vent 12b via outlet 32a, the drawn-in air that passes through inlet duct 31 and outlet duct 32.

To draw in air from inlet 31a of first seat cover 11b, blower 30 is disposed in first seat pad 11a (inside first seat pad 11a in the present embodiment). In the present embodiment, blower 30 is disposed in a path of inlet duct 31. However, blower 30 may be disposed outside inlet duct 31 if air is allowed to pass through inlet duct 31 and outlet duct 32. Blower 30 may be disposed outside first seat pad 11a. The position of blower 30 is not limited to a particular place.

Furthermore, blower 30 includes current detection circuit 51 that detects current consumption of blower 30. More specifically, current detection circuit 51 detects current consumption which refers to a current supplied from power source 70 via controller 60 and consumed by the activation of blower 30. Current detection circuit 51 outputs information indicating the detected current consumption to controller 60 at predetermined intervals.

Current detection circuit 51 also serves as an overcurrent detection circuit of blower 30. Current detection circuit 51 detects an overcurrent of blower 30 to keep blower 30 from damage or the like caused by a current exceeding a current rating. Current detection circuit 51 also outputs the detected overcurrent as information indicating current consumption to controller 60 at predetermined intervals. The current consumption indicated in this information is obtained at the time of detecting the current consumption of blower 30 by current detection circuit 51. In other words, this current consumption substantially indicates the current that is currently being consumed by blower 30.

Inlet duct 31 draws in the air led by blower 30, from a front surface of seat 1 (that is, from the surface opposite to the occupant sitting on seat 1). More specifically, inlet duct 31 leads the air drawn in from inlet 31a provided in seat base 10 of seat 1 to outlet duct 32. Thus, the air flows inside inlet duct 31. One end of inlet duct 31 forms inlet 31a, and the other end is connected to blower 30. Inlet 31a is capable of drawing in air from the surface which is the seating side of seat base 10 and on which the occupant sits (that is, seating surface 11c). Inlet 31a corresponds to first vent 12a of first seat cover 11b. Inlet 31a overlaps with first vent 12a when viewed in the Z-axis direction. In the present embodiment, inlet 31a draws in air via first vent 12a. However, inlet 31a may be configured to directly draw in air.

In the present embodiment, a plurality of inlets 31a are included. To be more specific, inlets 31a are provided in a center portion 11c1 and outer edge portion 11c2 of seating surface 11c which is included in seat 1 and on which the occupant sits.

The plurality of inlets 31a are arranged in the center portion 11c1 along the X-axis direction. Moreover, the plurality of inlets 31a are arranged in the outer edge portion 11c2 in the X-axis direction on both sides of the plurality of inlets 31a of the center portion 11c1 in in the Y-axis positive direction and the Y-axis negative direction. To be more specific, the plurality of inlets 31a arranged in the X-axis direction are arranged into a plurality of rows in the Y-axis direction on the surface of first seat pad 11a in the Z-axis positive direction.

Furthermore, outer edge portion 11c2 is at least one of rear portion 11d or front edge portion 11e of seating surface 11c. In the present embodiment, outer edge portion 11c2 further includes: sides portion 11f of first seat pad 11a in the Y-axis positive direction with respect to center portion 11c1; and sides portion 11f of first seat pad 11a in the Y-axis negative direction with respect to center portion 11c1.

Rear portion 11d of seating surface 11c is located rearward of center portion 11c1 of seating surface 11c. Front edge portion 11e of seating surface 11c is located forward of center portion 11c1 of seating surface 11c. Sides portion 11f of seating surface 11c in the Y-axis positive direction is located on the left-hand side of center portion 11c1 of seating surface 11c. Sides portion 11f of seating surface 11c in the Y-axis negative direction is located on the right-hand side of center portion 11c1 of seating surface 11c. Sides portion 11f in the Y-axis positive direction and sides portion 11f in the Y-axis negative direction refer to both peak portions of seat base 10.

Inlets 31a provided in rear portion 11d, front edge portion 11e, sides portion 11f in the Y-axis positive direction, and sides portion 11f in the Y-axis negative direction are less likely to be covered by the buttocks and thighs when the person is sitting on seat 1.

Outlet duct 32 is a duct through which the air led by blower 30 is discharged from the front surface of seat 1. More specifically, outlet duct 32 further leads the air led through inlet duct 31 and thereby discharges the air from outlet 32a provided in seat back 13 of seat 1. One end of outlet duct 32 forms outlet 32a, and the other end is connected to blower 30. Outlet 32a corresponds to second vent 12b of second seat cover 13b. Outlet 32a overlaps with second vent 12b when viewed in the X-axis direction. In the present embodiment, outlet 32a discharges air via second vent 12b. However, outlet 32a may be configured to directly discharge air.

In the present embodiment, outlet duct 32 extends from blower provided in first seat pad 11a to second seat pad 13a. Moreover, in the present embodiment, outlet duct 32 extends to the plurality of second vents 12b provided in a middle portion of second seat cover 13b in the Z-axis direction, and also extends to the plurality of second vents 12b provided in the Y-axis positive direction. Outlet 32a is provided at a position corresponding to at least one of the head, the neck, the shoulders, the back, or the waist of the occupant.

Note that although inlet duct 31 is provided in seat base 10 and outlet duct 32 extends across seat base 10 and seat back 13, this is not intended to be limiting. For example, outlet duct 32 may be provided in seat base 10 and inlet duct 31 may extend across seat base 10 and seat back 13. In this case, second vent 12b of seat back 13 may directly communicate with inlet duct 31 so that the air is drawn in from second vent 12b. Moreover, first vent 12a of seat base may directly communicate with outlet duct 32 so that the air is discharged from first vent 12a.

Note that inlet duct 31 and outlet duct 32 may be provided only in seat base 10 or only in seat back 13. For example, if these are provided only in seat base 10, an inlet of inlet duct 31 for drawing in air may be provided in the undersurface, the right-hand side surface, or the left-hand side surface of seat base 10. Then, first vent 12a of seat base 10 may directly communicate with outlet duct 32 so that the air may be discharged from first vent 12a. Alternatively, if these are provided only in seat back 13, an inlet of inlet duct 31 may be provided in a back surface, the right-hand side surface, or the left-hand side surface of seat back 13. Then, second vent 12b of seat back 13 may directly communicate with outlet duct 32 so that the air may be discharged from second vent 12b.

[Storage 80]

Storage 80 includes: nonvolatile memory that stores a program; and volatile memory that is a temporary storage area used for executing a program. Storage 80 is communicatively connected to controller 60. Storage 80 stores, for example, information indicating current consumption of blower 30 driven in a standard mode when the occupant is not sitting on seat 1 of vehicle 2 that is thus in non-use or when a door of vehicle 2 in non-use is unlocked. More specifically, the current consumption of blower 30 indicated in this information at a time when vehicle 2 is in non-use or when a door of vehicle 2 in non-use is unlocked is an initial value.

In the present embodiment, storage 80 is not included in controller 60. Note that storage 80 may be included in controller 60.

[Voltage Detection Circuit 52]

Voltage detection circuit 52 detects a drive voltage of blower 30. The drive voltage refers to a voltage supplied from power source 70 to blower 30 via controller 60. Voltage detection circuit 52 outputs information indicating the detected drive voltage to controller 60 at predetermined intervals.

In the present embodiment, voltage detection circuit 52 is not included in blower 30. Note that voltage detection circuit 52 may be included in blower 30.

[Controller 60]

Controller 60 is electrically connected to blower 30, and obtains the information indicating the current consumption from current detection circuit 51 of blower 30. Controller 60 determines whether the occupant is sitting on seat 1, based on the current consumption detected by current detection circuit 51 and indicated in the obtained information. More specifically, controller 60 can determine whether the current consumption is smaller than a first threshold value, based on the current consumption. If the current consumption is smaller than the first threshold value when whether the occupant is sitting on seat 1 is determined, controller 60 determines that the occupant is sitting on seat 1. If determining that the occupant is sitting on seat 1, controller 60 controls blower 30 so that a revolution speed of blower 30 becomes equal to a steady revolution speed. More specifically, if determining that the occupant is sitting on seat 1, controller 60 performs control to drive blower 30 at the steady revolution speed by executing the standard mode. At the steady revolution speed, the numbers of revolutions of a propeller and a rotation axis of blower 30 are constant.

In contrast, if the current consumption is greater than or equal to the first threshold value when whether the occupant is sitting on seat 1 is determined, controller 60 determines that the occupant is not sitting on seat 1. If determining that the occupant is not sitting on seat 1, controller 60 performs control to drive blower 30 at a revolution speed lower than the revolution speed provided when it is determined that the occupant is sitting on seat 1. More specifically, if determining that the occupant is not sitting on seat 1, controller 60 performs control to drive blower 30 at a lower revolution speed by executing an energy-saving mode. To execute the energy-saving mode, controller 60 causes the current applied to blower 30 to be less than the current applied to blower 30 driven at the steady revolution speed.

Here, if determining that the occupant is not sitting on seat 1, controller 60 may drive, only for a predetermined period, blower 30 at a revolution speed lower than the revolution speed provided when it is determined that the occupant is sitting on seat 1. Then, if determining again that the occupant is not sitting on seat 1 after a lapse of the predetermined period, controller 60 may drive blower 30 at an even lower revolution speed. In the energy-saving mode, controller 60 may control blower 30 in stages.

As described above, controller 60 has the standard mode and the energy-saving mode to control blower 30. Controller 60 switches between the standard mode and the energy-saving mode as appropriate, based on the current consumption, or more specifically, depending on whether the occupant is sitting on seat 1. Furthermore, in the standard mode, controller 60 performs control to drive blower at the steady revolution speed and thereby can stabilize the amount of air to be blown on the occupant sitting on seat 1.

Furthermore, whenever receiving the information indicating the current consumption from current detection circuit 51, controller 60 determines whether the current consumption exceeds an upper limit. If the current consumption exceeds the upper limit, or more specifically, if an overcurrent is assumed to have occurred, controller 60 outputs a warning signal to an external device. The warning signal outputted by controller 60 allows the occupant to become aware that a current exceeding a current rating causes: damage or the like to blower 30; clogging to the inlet duct or the outlet duct; or deterioration or the like to the cushion. Here, the external device is vehicle control unit 61. However, the external device may be a terminal device, such as a smartphone or a tablet.

Controller 60 corrects the current consumption of blower 30 or the first threshold value, based on the drive voltage detected by voltage detection circuit 52. For example, although the electric power supplied to blower 30 is to be constant, the current value can fluctuate due to fluctuations in the value of voltage supplied from power source 70 to blower 30 (for example, fluctuations caused by deterioration or load changes of a battery that is not shown but included in power source 70). Fluctuations in the current consumption can cause controller 60 to fail to accurately determine whether the occupant is sitting on seat 1. Thus, to keep the electric power supplied to blower 30 constant, controller 60 corrects the current value (that is, the current consumption) that fluctuates simultaneously with the fluctuations in the voltage value or corrects the first threshold value.

Furthermore, by driving blower 30 when vehicle 2 is in non-use or when a door of vehicle 2 in non-use is unlocked, controller 60 corrects the current consumption detected by current detection circuit 51 as the first threshold value. More specifically, controller 60 obtains, via current detection circuit 51, the information indicating the current consumption of blower 30 driven in the standard mode when the occupant is not sitting on seat 1 of vehicle 2 that is stationary and thus is in non-use or when a door of vehicle 2 in non-use is unlocked (this current consumption may also be referred to as the current consumption of blower 30 driven when vehicle 2 is in non-use or when a door of vehicle 2 in non-use is unlocked). Controller 60 stores, as the first threshold value, the current consumption of blower 30 driven when vehicle 2 is in non-use or when a door of vehicle 2 in non-use is unlocked as indicated in this information, into storage 80. With this, controller 60 updates the first threshold value to the current consumption of blower 30 driven when vehicle 2 is in non-use or when a door of vehicle 2 in non-use is unlocked. Here, examples of when vehicle 2 is in non-use include when the occupant is not sitting on seat 1 and when an engine switch is OFF.

Here, controller 60 may drive blower 30 for any period when vehicle 2 is in non-use. Then, by storing, into storage 80, an average value of power consumption of blower 30 within this period when vehicle 2 is in non-use or when a door of vehicle 2 in non-use is unlocked, controller 60 may update the first threshold value to the current consumption of blower 30 driven when vehicle 2 is in non-use or when a door of vehicle 2 in non-use is unlocked.

[Power Source 70]

Power source 70 is a power circuit that supplies electric power to blower 30 via controller 60 for instance. Here, power source 70 is a direct-current power source that is supplied with direct current from a battery that is not shown. Under the control of controller 60, power source 70 adjusts the current to be supplied to blower 30 for instance.

<Operation>

Examples of operation performed by vehicle seat air-conditioning device 3 according to the present embodiment are described.

Operation Example 1

Figure 4:
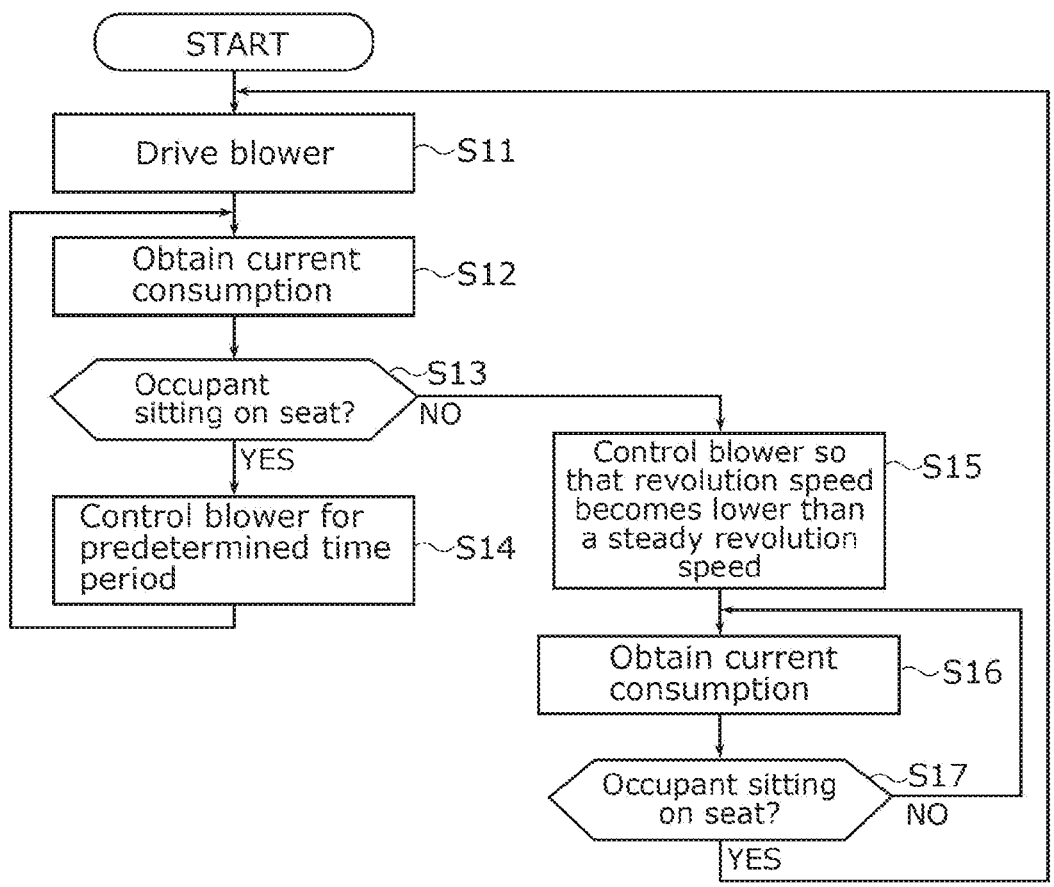
FIG. 4 is a flowchart of operation example 1 performed by the vehicle seat air-conditioning device according to Embodiment 1.

FIG. 4 is a flowchart of operation example 1 performed by vehicle seat air-conditioning device 3 according to Embodiment 1. This flowchart is intended to be started in the standard mode.

For example, an operation performed by the occupant using an operation panel included in vehicle 2 drives vehicle seat air-conditioning device 3. When receiving a driving instruction from the operation panel, controller 60 of vehicle seat air-conditioning device 3 drives blower 30 (S11). With this, air is drawn in from first vent 12a. Then, after being led through inlet duct 31 and next through outlet duct 32, the air is discharged from second vent 12b. As a result, the air is blown on the occupant sitting on seat 1.

Next, controller 60 obtains the information indicating the current consumption from current detection circuit 51 (S12).

Next, based on the current consumption indicated in the obtained information, controller 60 determines whether the occupant is sitting on seat 1 (S13). To be more specific, based on the current consumption, controller 60 determines whether the current consumption is smaller than the first threshold value.

If the current consumption is smaller than the first threshold value when whether the occupant is sitting on seat 1 is determined, controller 60 determines that the occupant is sitting on seat 1 (YES in S13).

Next, controller 60 controls blower 30 in the standard mode for a predetermined period (S14). As a result, the air is blown on the occupant sitting on seat 1 for the predetermined period. Then, controller 60 returns to Step S12.

In contrast, if the current consumption is greater than or equal to the first threshold value when whether the occupant is sitting on seat 1 is determined, controller 60 determines that the occupant is not sitting on seat 1 (NO in S13).

Next, controller 60 controls blower 30 so that a revolution speed of blower 30 becomes lower than the revolution speed provided when it is determined that the occupant is sitting on seat 1 (S15). To reduce the current consumption of vehicle seat air-conditioning device 3, controller 60 switches from the standard mode to the energy-saving mode and thus executes the energy-saving mode.

Next, controller 60 obtains the information indicating the current consumption from current detection circuit 51 (S16).

Next, based on the current consumption indicated in the obtained information, controller 60 determines whether the occupant is sitting on seat 1 (S17). To be more specific, based on the current consumption, controller 60 determines whether the current consumption is smaller than the first threshold value.

If the current consumption is smaller than the first threshold value when whether the occupant is sitting on seat 1 is determined, controller 60 determines that the occupant is sitting on seat 1 (YES in S17). After this, controller 60 returns to Step S11. Then, controller 60 switches from the energy-saving mode to the standard mode and thus executes the standard mode.

In contrast, if the current consumption is greater than or equal to the first threshold value when whether the occupant is sitting on seat 1 is determined, controller 60 determines that the occupant is not sitting on seat 1 (NO in S17). After this, controller 60 returns to Step S16.

Note that an operation performed by the occupant using the operation panel included in vehicle 2 can freely stop the driving of vehicle seat air-conditioning device 3 in any step.

Note that, in the energy-saving mode, the flowchart may start at Step S15. Thus, the flowchart illustrated in FIG. 4 is not intended to be limiting.

Figure 5:
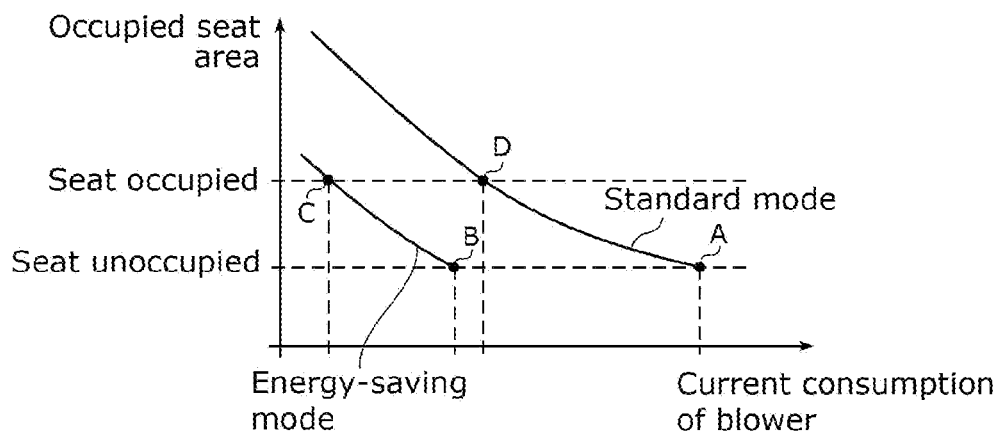
FIG. 5 illustrates an example of a relationship between current consumption of a blower and occupied seat area for each of a standard mode and an energy-saving mode.

The following describes in detail the present operation example where the operation is started in the standard mode when the occupant is not sitting on seat 1, with reference to FIG. 4 and FIG. 5. FIG. 5 illustrates an example of a relationship between current consumption of blower 30 and occupied seat area for each of the standard mode and the energy-saving mode. The occupied seat area is intended to represent an area that is to be occupied when the occupant with standard body size is sitting on the seat.

As illustrated in FIG. 4 and FIG. 5, the point is at A at the start. At this time, based on the current consumption indicated in the information obtained from current detection circuit 51 (S12), controller 60 determines whether the occupant is sitting on seat 1 (S13).

Next, because the occupant is not sitting on seat 1, controller 60 determines that the current consumption is greater than or equal to the first threshold value and that thus the occupant is not sitting on seat 1 (NO in S13). At this time, the point moves from A to B in FIG. 5. Controller 60 switches from the standard mode to the energy-saving mode and thus executes the energy-saving mode. Then, controller 60 controls blower 30 so that the revolution speed of blower 30 becomes lower than the revolution speed provided when it is determined that the occupant is sitting on seat 1 (S15).

Next, based on the current consumption indicated in the information obtained at the predetermined intervals (S16), controller 60 determines whether the occupant is sitting on seat 1 (S17). If the occupant sits on seat 1, the current consumption becomes smaller than the first threshold value and controller 60 thus determines that the occupant is sitting on seat 1 (YES in S17). At this time, the point moves from B to C in FIG. 5.

Next, controller 60 switches from the energy-saving mode to the standard mode and thus executes the standard mode. At this time, the point moves from C to D in FIG. 5. Controller 60 drives blower 30 in the standard mode (S11).

Next, based on the obtained current consumption (S12), controller 60 determines whether the occupant is sitting on seat 1 (S13). If the occupant moves away from seat 1 by stepping out of the vehicle or by relaxing the posture for example, the current consumption becomes greater than or equal to the first threshold value and controller 60 thus determines that the occupant is not sitting on seat 1 (NO in S13). Then, the point returns to A from D in FIG. 5. In this way, such a cycle can be given by vehicle seat air-conditioning device 3.

Furthermore, the present operation example may be started in the standard mode when the occupant is sitting on seat 1. In this case, the point is at D at the start in FIG. 5. Then, in accordance with the occupant stepping out of the vehicle and getting into the vehicle again for example, the point moves to A, then to B, and then to C and returns to D as described above. Here, description with reference to FIG. 4 is identical to the above, and thus is omitted. Note that because the operation may be started in the energy-saving mode, the operation started in the standard mode is not intended to be limiting.

Furthermore, the point may move from A to D in FIG. 5.

For example, if the occupant is not sitting on seat 1 in the standard mode, the point is at A in FIG. 5. If the occupant sits on seat 1 at this time, the current consumption becomes smaller than the first threshold value and controller 60 thus determines that the occupant is sitting on seat 1 (YES in S13). Then, the point moves from A to D in FIG. 5. At this time, controller 60 continues the execution of the standard mode for the predetermined period (S14)

Furthermore, the point may move from C to B in FIG. 5.

For example, if the occupant is sitting on seat 1 in the energy-saving mode, the point is at C in FIG. 5. At this time, based on the current consumption indicated in the information obtained at the predetermined intervals (S16), controller 60 determines whether the occupant is sitting on seat 1 (S17). If the occupant is not sitting on seat 1 by relaxing the posture for example, the current consumption becomes greater than or equal to the first threshold value and controller 60 thus determines that the occupant is not sitting on seat 1 (NO in S17). At this time, the point moves from C to B in FIG. 5. Controller 60 continues the execution of the energy-saving mode until the occupant sits on seat 1.

Operation Example 2

Figure 6:
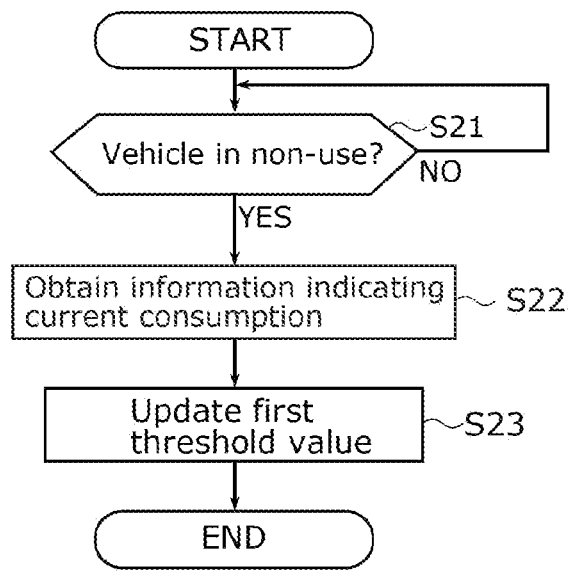
FIG. 6 is a flowchart of operation example 2 performed by the vehicle seat air-conditioning device according to Embodiment 1.

FIG. 6 is a flowchart of operation example 2 performed by vehicle seat air-conditioning device 3 according to Embodiment 1.

Controller 60 determines whether vehicle 2 is in non-use (S21). For example, controller 60 determines whether vehicle 2 is in non-use by determining whether the engine switch is OFF. If the engine switch is OFF, vehicle 2 is in non-use. In this case, it is generally determined that the occupant is not sitting on seat 1.

If vehicle 2 is in use (NO in S21), controller 60 returns to Step S21.

In contrast, if vehicle 2 is in non-use (YES in S21), controller 60 drives blower 30 in the standard mode and thereby obtains, from current detection circuit 51, the information indicating the current consumption of blower 30 driven when vehicle 2 is in non-use or when a door of vehicle 2 in non-use is unlocked (S22).

Next, by storing the current consumption of blower 30 in this information when vehicle 2 is in non-use or when a door of vehicle 2 in non-use is unlocked as the first threshold value into storage 80, controller 60 updates the first threshold value to the current consumption of blower 30 driven when vehicle 2 is in non-use or when a door of vehicle 2 in non-use is unlocked (S23). More specifically, controller 60 updates the initial value previously stored in storage 80. After this, controller 60 ends the flowchart in FIG. 6.

Here, even when the engine switch is OFF, the occupant may be sitting on seat 1 on occasion. In this case, controller 60 may inform that vehicle seat air-conditioning device 3 is to be driven, via a display device included in vehicle 2 for example.

Operation Example 3

Figure 7:
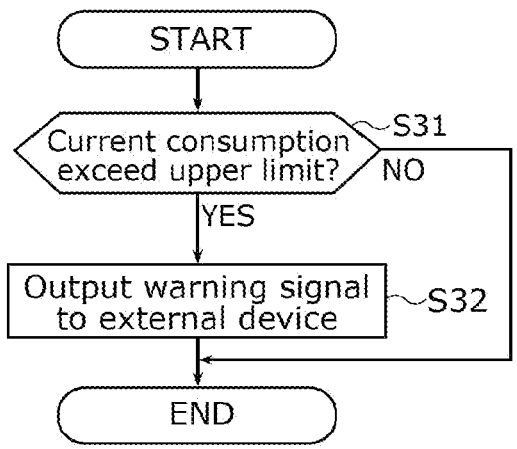
FIG. 7 is a flowchart of operation example 3 performed by the vehicle seat air-conditioning device according to Embodiment 1.

FIG. 7 is a flowchart of operation example 3 performed by vehicle seat air-conditioning device 3 according to Embodiment 1.

Controller 60 obtains the information indicating the current consumption from current detection circuit 51 and determines whether the obtained current consumption exceeds the upper limit (S31). The upper limit is preset as an upper limit of the current consumption in a normal operation.

If determining that the current consumption exceeds the upper limit (YES in S31), or more specifically, if an overcurrent passes through blower 30, controller 60 outputs the warning signal to the external device (S32).

In contrast, if determining that the current consumption does not exceed the upper limit (NO in S31), controller 60 ends the flowchart in FIG. 7.

Note that although operation examples 1 to 3 are described in the present embodiment, vehicle seat air-conditioning device 3 need not achieve all of operation examples 1 to 3. Operation examples 1 to 3 may be combined as appropriate. Furthermore, vehicle seat air-conditioning device 3 need not execute all the steps in operation example 1. Thus, the execution of all the steps in operation example 1 is not intended to be limiting.

Operation Example 4

The present operation example describes the case where whether a door of vehicle 2 in non-use is unlocked is determined.

Figure 8:
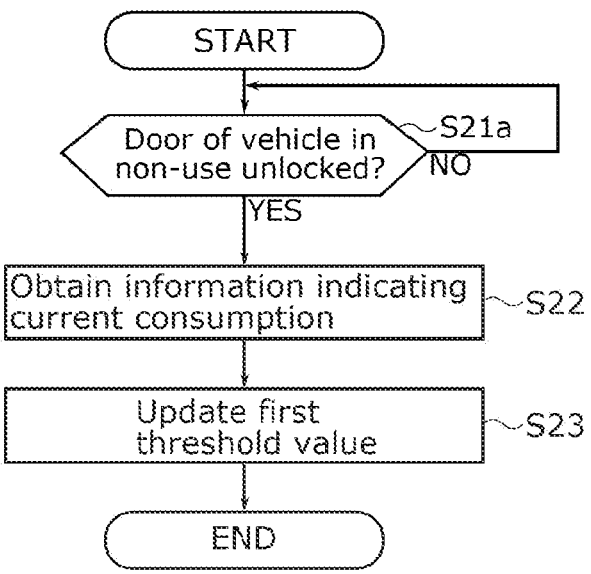
FIG. 8 is a flowchart of operation example 4 performed by the vehicle seat air-conditioning device according to Embodiment 1.

FIG. 8 is a flowchart of operation example 4 performed by vehicle seat air-conditioning device 3 according to Embodiment 1. Processes in the present operation example that are identical to those in FIG. 6 are assigned reference marks identical to those used in FIG. 6, and thus descriptions on these processes are omitted as appropriate.

Controller 60 determines whether a door of vehicle 2 in non-use is unlocked (S21a). For example, controller 60 determines whether vehicle 2 is in non-use by determining whether the engine switch is OFF. Furthermore, controller 60 determines whether a door of vehicle 2 is unlocked by determining whether a lock-unlock signal indicating that a door of vehicle 2 is unlocked is obtained from a door lock-unlock sensor included in vehicle 2. Note that whether the door is unlocked may be determined by determining whether a door unlock operation is performed using a key to vehicle 2.

If determining that a door of vehicle 2 in non-use is not unlocked (NO in S21a), controller 60 returns to Step S21a.

Next, if determining that a door of vehicle 2 in non-use is unlocked (YES in S21a), controller 60 drives blower 30 in the standard mode and thereby obtains, from current detection circuit 51, the information indicating the current consumption of blower 30 driven when vehicle 2 is in non-use or when a door of vehicle 2 in non-use is unlocked (S22).

Next, by storing the current consumption of blower 30 in this information when vehicle 2 is in non-use or when a door of vehicle 2 in non-use is unlocked as the first threshold value into storage 80, controller 60 updates the first threshold value to the current consumption of blower 30 driven when vehicle 2 is in non-use or when a door of vehicle 2 in non-use is unlocked (S23). Then, controller 60 ends the flowchart in FIG. 8. After this, vehicle seat air-conditioning device 3 moves to the operation of the flowchart illustrated in FIG. 4.

<Function Effects>

Next, function effects of vehicle seat air-conditioning device 3 according to the present embodiment are described.

As described above, vehicle seat air-conditioning device 3 according to the present embodiment includes: blower 30 that is included in seat 1; at least one of: an inlet duct that draws in, from a surface of seat 1, air led by blower 30; or an outlet duct through which air led by blower 30 is discharged from a surface of seat 1; and controller 60 that is electrically connected to blower 30. Blower 30 includes current detection circuit 51 that detects current consumption of blower 30. Controller 60 determines whether an occupant is sitting on seat 1, based on the current consumption detected by current detection circuit 51.

With this, controller 60 can determine whether the occupant is sitting on the seat, depending on a small or large amount of current consumption detected by current detection circuit 51 through the control over blower 30. For example, if the current consumption detected by current detection circuit 51 is smaller than the current consumption detected when the occupant is not sitting on seat 1, the controller determines that the occupant is sitting on seat 1.

Thus, vehicle seat air-conditioning device 3 is capable of detecting seat occupancy by the occupant with a simple configuration.

In particular, unlike the conventional vehicle seat air-conditioning device, the seat occupancy by the occupant can be detected without an additional sensor. This can keep production costs of vehicle seat air-conditioning device 3 from rising.

If the current consumption is smaller than a first threshold value when whether the occupant is sitting on seat 1 is determined, controller 60 of vehicle seat air-conditioning device 3 according to the present embodiment determines that the occupant is sitting on seat 1.

With this, if the current consumption is smaller than the first threshold value, or more specifically, if the current consumption is smaller than the current consumption detected when the occupant is not sitting on seat 1, controller 60 determines that the occupant is sitting on seat 1. Accurate determination of whether the occupant is sitting on the seat allows controller 60 to control blower 30. This can reduce the current consumption of blower 30 in the absence of the occupant.

Furthermore, if determining that the occupant is sitting on seat 1, controller 60 of vehicle seat air-conditioning device 3 according to the present embodiment controls blower 30 so that a revolution speed of blower 30 becomes equal to a steady revolution speed.

With this, if the occupant is sitting on seat 1, controller 60 can stabilize the revolution speed of blower 30 at the steady revolution speed by maintaining electric power supplied to blower 30 constant. Thus, a more appropriate amount of air blown on the occupant provides the occupant with more comfort.

If the current consumption is greater than or equal to the first threshold value when whether the occupant is sitting on seat 1 is determined, controller 60 of vehicle seat air-conditioning device 3 according to the present embodiment determines that the occupant is not sitting on seat 1. If determining that the occupant is not sitting on seat 1, controller 60 controls blower 30 so that the revolution speed of blower 30 becomes lower than the revolution speed provided when it is determined that the occupant is sitting on seat 1.

With this, if the occupant is not sitting on seat 1, controller 60 can control blower 30 by reducing the electric power supplied to blower 30. This can reduce the power consumption to save energy.

Furthermore, by driving blower 30 when vehicle 2 is in non-use or when a door of vehicle 2 in non-use is unlocked, controller 60 of vehicle seat air-conditioning device 3 according to the present embodiment updates the first threshold value to the current consumption detected by current detection circuit 51.

With this, even if seat 1 or blower 30 deteriorates over time, the current consumption updated as the first threshold value ensures accurate determination of whether the occupant is sitting on seat 1.

Furthermore, vehicle seat air-conditioning device 3 according to the present embodiment further includes voltage detection circuit 52 that detects a drive voltage of blower 30. Controller 60 corrects the current consumption of blower 30, based on the drive voltage detected by voltage detection circuit 52.

With this, the current consumption can be corrected, by previously measuring the current consumption of blower 30 based on a change in the applied voltage. Thus, even if the applied voltage changes due to deterioration of a battery for example, whether the occupant is sitting on seat 1 can be more accurately determined.

Furthermore, vehicle seat air-conditioning device 3 according to the present embodiment further includes voltage detection circuit 52 that detects a drive voltage of blower 30. Controller 60 corrects the first threshold value, based on the drive voltage detected by voltage detection circuit 52.

With this, the first threshold value can also be corrected, by previously measuring the current consumption of blower 30 based on a change in the applied voltage. Thus, even if the applied voltage changes due to deterioration of a battery for example, whether the occupant is sitting on seat 1 can be more accurately determined.

Current detection circuit 51 of vehicle seat air-conditioning device 3 according to the present embodiment also serves as an overcurrent detection circuit of blower 30.

With this, current detection circuit 51 can detect an overcurrent of blower 30 without an overcurrent detection circuit separately added to blower 30. Alternatively, current detection circuit 51 can be implemented by an overcurrent detection circuit originally included in blower 30. This can keep the configuration of vehicle seat air-conditioning device 3 from increasing in complexity and also keep production costs of vehicle seat air-conditioning device 3 from rising.

If the current consumption exceeds an upper limit, controller 60 of vehicle seat air-conditioning device 3 according to the present embodiment outputs a warning signal to an external device.

If the current consumption exceeds the preset upper limit as above, blower 30 may have a failure or may be controlled at a revolution speed higher than normal. Thus, a failure of blower 30, clogging of inlet duct 31 or outlet duct 32, or deterioration of a cushion can be expected. The occupant can be informed about replacement or cleaning of blower 30 or about replacement of the cushion. This allows the occupant to keep seat 1 in an appropriate state.

Note that the upper limit may include a first upper limit and a second upper limit that is greater than the first upper limit. In this case, if the current consumption exceeds the first upper limit and is smaller than or equal to the second upper limit, clogging of the inlet duct or the outlet duct or deterioration of the cushion is expected. Moreover, if the current consumption exceeds the second upper limit, a failure of blower 30 is expected. With these two upper limits set in this way, the occupant can be separately informed of: the warning about cleaning or replacement of the cushion; and the warning about replacement of blower 30.

Furthermore, vehicle seat air-conditioning device 3 according to the present embodiment includes inlet duct 31 that is provided in center portion 11c1 and outer edge portion 11c2 of seating surface 11c which is a seating side of seat 1 and on which the occupant sits.

With this, between seating surface 11c and the buttocks and thighs, the air drawn in from inlet 31a of inlet duct 31 provided in center portion 11c1 of seating surface 11s can prevent the buttocks and thighs of the person from being sweaty. Furthermore, inlet 31a of inlet duct 31 provided in outer edge portion 11c2 of seating surface 11c is less likely to be covered by the buttocks and thighs of the person and thus can draw in the air around seat 1. For example, if inlet 31a of inlet duct 31 provided in center portion 11c1 of seating surface 11c is unable to draw in the air, inlet 31a of inlet duct 31 provided in outer edge portion 11c2 of seating surface 11c is able to draw in the air. Thus, the air can be discharged from outlet 32a.

Furthermore, vehicle seat air-conditioning device 3 according to the present embodiment includes outer edge portion 11c2 that is at least one of rear portion 11d or front edge portion 11e of seating surface 11c.

With this, especially rear portion 11d and front edge portion 11e of outer edge portion 11c2 of seating surface 11c are even less likely to be covered by the buttocks and thighs of the person. This increases the accuracy of air suction from inlet 31a.

Embodiment 2

The present embodiment is different from Embodiment 1 describing seat air-conditioning device 3 in that the body size of the occupant and the posture of the occupant are determined using the current consumption of blower 30. The other components according to the present embodiment are identical to those according to Embodiment 1 unless otherwise specified. The components and functions identical to those described above are assigned reference signs identical to those used in Embodiment 1 and detailed descriptions on these components and functions are omitted here.

Differences between vehicle seat air-conditioning device 3 according to the present embodiment and vehicle seat air-conditioning device 3 according to Embodiment 1 are described with reference to FIG. 2 and FIG. 3.

[Storage 80]

Storage 80 also stores information indicating a second threshold value and information indicating a correlation between current consumption and revolution speed as described later. The second threshold value is calculated from the current consumption of the blower when the occupant with average body size is sitting on seat 1. The average body size refers to a standard body size of the occupant.

[Controller 60]

Controller 60 is electrically connected to blower 30, and obtains the information indicating the current consumption from current detection circuit 51 of blower 30. Using the current consumption indicated in the obtained information, controller 60 controls the revolution speed of blower 30, determines the body size of the occupant, determines the posture of the occupant, and determines whether the current consumption exceeds the upper limit.

Controller 60 controls the revolution speed of blower 30, based on the current consumption indicated in the obtained information. To be more specific, controller 60 obtains the information indicating the second threshold value previously stored in storage 80, and then calculates a value by subtracting the current consumption currently detected by current detection circuit 51 from the second threshold value indicated in the obtained information. Based on the calculated value, controller 60 can determine whether the current consumption is smaller or greater than the second threshold value.

Controller 60 controls blower 30 so that the revolution speed increases as the current consumption grows smaller than the second threshold value. As a result, the current to be supplied to blower 30 is more than the current supplied when the occupant with average body size is sitting on seat 1. Thus, the current consumption of blower 30 increases, and the amount of air also increases. Note that because there is a lower limit smaller than the second threshold value, controller 60 controls blower 30 between the lower limit and the second threshold value.

Furthermore, controller 60 controls blower 30 so that the revolution speed decreases as the current consumption grows greater than the second threshold value. As a result, the current to be supplied to blower 30 is less than the current supplied when the occupant with average body size is sitting on seat 1. Thus, the current consumption of blower 30 decreases, and the amount of air also decreases. Note that because there is a seat-occupancy determination value greater than the second threshold value, controller 60 controls blower 30 between the seat-occupancy determination value and the second threshold value.

In this way, by controlling the revolution speed of blower 30, controller 60 causes a constant amount of air to be discharged from the front surface of seat 1 (the amount of air blowing on the occupant) regardless of the state of the occupant sitting on seat 1. Here, the phrase "regardless of the state of the occupant" means "regardless of the body size or posture of the occupant". Thus, regardless of whether the body size of the occupant is large or small or whether the occupant relaxes the posture, the amount of air equal to that blown on the occupant with average body size sitting on seat 1 is discharged.

Although the constant amount of air is discharged regardless of the state of the occupant, this is not intended to be limiting. The amount of air may be changed depending on the body size of the occupant. More specifically, the amount of air may increase with increase in body size of the occupant, for example.

Furthermore, based on the current consumption, controller 60 determines the body size of the occupant sitting on seat 1. Then, controller 60 outputs a signal indicating the body size of the occupant (this signal may also be referred to as the body size signal) as a determination result to the external device. Here, the external device is vehicle control unit 61. However, the external device may be a terminal device, such as a smartphone or a tablet.

As described above, the smaller the current consumption of blower 30 is than the second threshold value, the "larger" the body size of the occupant is. Furthermore, as described above, the greater the current consumption of blower 30 is than the second threshold value, the "smaller" the body size of the occupant is. Thus, if the current consumption detected by current detection circuit 51 is smaller than the second threshold value, controller 60 determines that the body size of the occupant is "large". Moreover, if the current consumption detected by current detection circuit 51 is equal to the second threshold value, controller 60 determines that the body size of the occupant is "average". Furthermore, if the current consumption detected by current detection circuit 51 is greater than the second threshold value, controller 60 determines that the body size of the occupant is "small". Controller 60 outputs, to the external device, the body size signal by which the body size of the occupant can be determined as one of "small", "average", or "large". Note that the body size signal indicating one of the aforementioned three levels is not intended to be limiting. For example, a numerical value indicating the body size based on the current consumption may be outputted.

Furthermore, controller 60 determines whether the posture of the occupant sitting on seat 1 has changed, based on a change in the current consumption. Then, controller 60 outputs a signal indicating the change in the posture of the occupant (this signal may also be referred to as the posture change signal) as a determination result to the external device. To be more specific, controller 60 calculates the change in the current consumption detected by current detection circuit 51 from when the occupant sat on seat 1. If the amount of change in the current consumption is greater than or equal to a specified value, controller 60 determines that the posture of the occupant sitting on seat 1 has changed. Controller 60 outputs the posture change signal to the external device as the determination result. Note that if the posture of the occupant has not changed, controller 60 may output a signal indicating no change in the posture of the occupant to the external device.

Here, the posture of the occupant changes when the occupant is not sitting up straight on the seat or when the occupant corrects an original posture to sit further back in seat 1. Examples of such case include: when the occupant is not sitting on seat 1 (when the buttocks and thighs are off seating surface 11*c*); when the occupant is sitting cross-legged on seat 1; and when the occupant is sitting with the legs crossed flat in front of the occupant on seat 1.

Moreover, examples of when the posture of the occupant does not change include not only when the posture of the occupant remains unchanged, but also when a change in the posture of the occupant can be tolerated within a specified range.

Furthermore, whenever receiving the information indicating the current consumption from current detection circuit 51, controller 60 determines whether the current consumption exceeds the upper limit. If the current consumption exceeds the upper limit, or more specifically, if an overcurrent is assumed to have occurred, controller 60 outputs a warning signal to the external device. The warning signal outputted by controller 60 allows the occupant to become aware that a current exceeding a current rating causes: damage or the like to blower 30; clogging to inlet duct 31 or outlet duct 32; or deterioration or the like to the cushion. Here, the upper limit is greater than the second threshold value and also greater than a seat-occupancy determination value described later.

Furthermore, controller 60 corrects the current consumption of blower 30 or the second threshold value. Controller 60 also corrects the information indicating the correlation between current consumption and revolution speed.

Controller 60 corrects the current consumption of blower 30 or the second threshold value, based on the drive voltage detected by voltage detection circuit 52. For example, although the electric power supplied to blower 30 is to be constant, the current value can fluctuate due to fluctuations in the value of voltage supplied from power source 70 to blower 30 (for example, fluctuations caused by deterioration or load changes of a battery that is not shown but included in power source 70). Fluctuations in the current consumption can cause controller 60 to fail to accurately determine the body size of the occupant sitting on seat 1. Thus, to keep the electric power supplied to blower 30 constant, controller 60 corrects the current value (that is, the current consumption) that fluctuates simultaneously with the fluctuations in the voltage value or corrects the second threshold value.

Furthermore, by driving blower 30 when vehicle 2 is in non-use or when a door of vehicle 2 in non-use is unlocked, controller 60 obtains the information indicating the current consumption detected by current detection circuit 51. Controller 60 corrects the information that indicates the correlation between current consumption and revolution speed and that is used for controlling the revolution speed based on the current consumption indicated in the obtained information. To be more specific, controller 60 calculates the revolution speed of blower 30 driven when the occupant is not sitting on seat 1, based on the current consumption of blower 30 driven when the occupant is not sitting on seat 1 of vehicle 2 that is stationary and thus vehicle 2 is in non-use. Controller 60 compares the current consumption and the revolution speed of blower 30 driven when vehicle 2 is in non-use, against the correlation (a correlation table), previously stored in storage 80, between current consumption and revolution speed. If a difference is found as a result of the comparison, controller 60 stores, into storage 80, an updated correlation between current consumption and calculated revolution speed of blower 30 driven when vehicle 2 is in non-use.

Here, controller 60 may drive blower 30 for any period when vehicle 2 is in non-use. Then, controller 60 may calculate an average value of power consumption of blower 30 within the period when vehicle 2 is in non-use. Then, by calculating the revolution speed of blower 30 based on the calculated power consumption, controller 60 may store, into storage 80, the updated correlation between current consumption and revolution speed of blower 30 driven when vehicle 2 is in non-use.

<Operation>

Examples of operation performed by vehicle seat air-conditioning device 3 according to the present embodiment are described.

Operation Example 1

Figure 9:
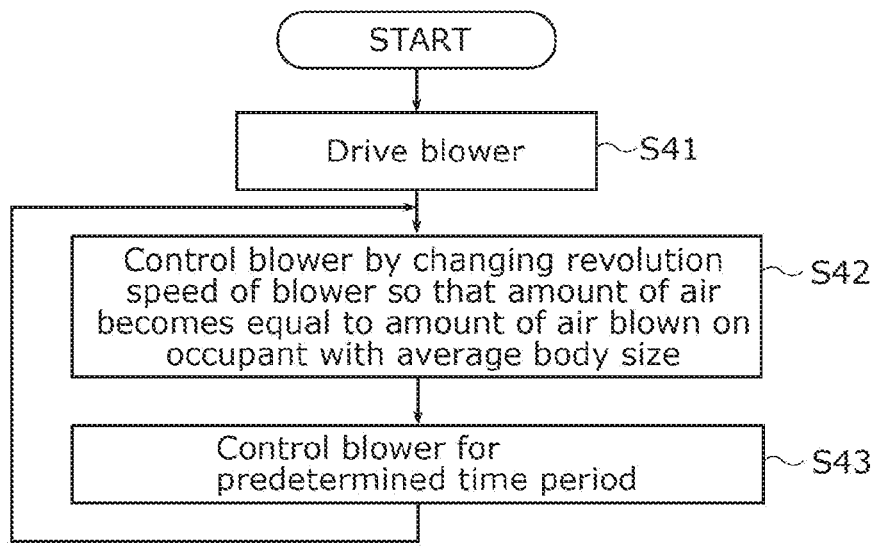
FIG. 9 is a flowchart of operation example 1 performed by a vehicle seat air-conditioning device according to Embodiment 2.

FIG. 9 is a flowchart of operation example 1 performed by vehicle seat air-conditioning device 3 according to Embodiment 2.

For example, an operation performed by the occupant using an operation panel included in vehicle 2 drives vehicle seat air-conditioning device 3. When receiving a driving instruction from the operation panel, controller 60 of vehicle seat air-conditioning device 3 drives blower 30 (S41). With this, air is drawn in from first vent 12a. Then, after being led through inlet duct 31 and next through outlet duct 32, the air is discharged from second vent 12b. As a result, the air is blown on the occupant sitting on seat 1.

Next, controller 60 obtains the information indicating the current consumption from current detection circuit 51 and also reads the information indicating the second threshold value stored in storage 80. Then, controller 60 calculates a value by subtracting the aforementioned second threshold value from the current consumption currently indicated by the obtained information. Controller 60 reads a correlation graph stored in storage 80. Then, based on the calculated value, controller 60 controls blower 30 by changing the revolution speed of blower 30 so that the amount of air becomes equal to the amount of air blown on the occupant with average body size (S42). Here, a of FIG. 10 illustrates an example of a relationship between body size and current consumption of blower 30, and b of FIG. 10 illustrates an example of a relationship between revolution speed of blower 30 and body size.

Figure 10:
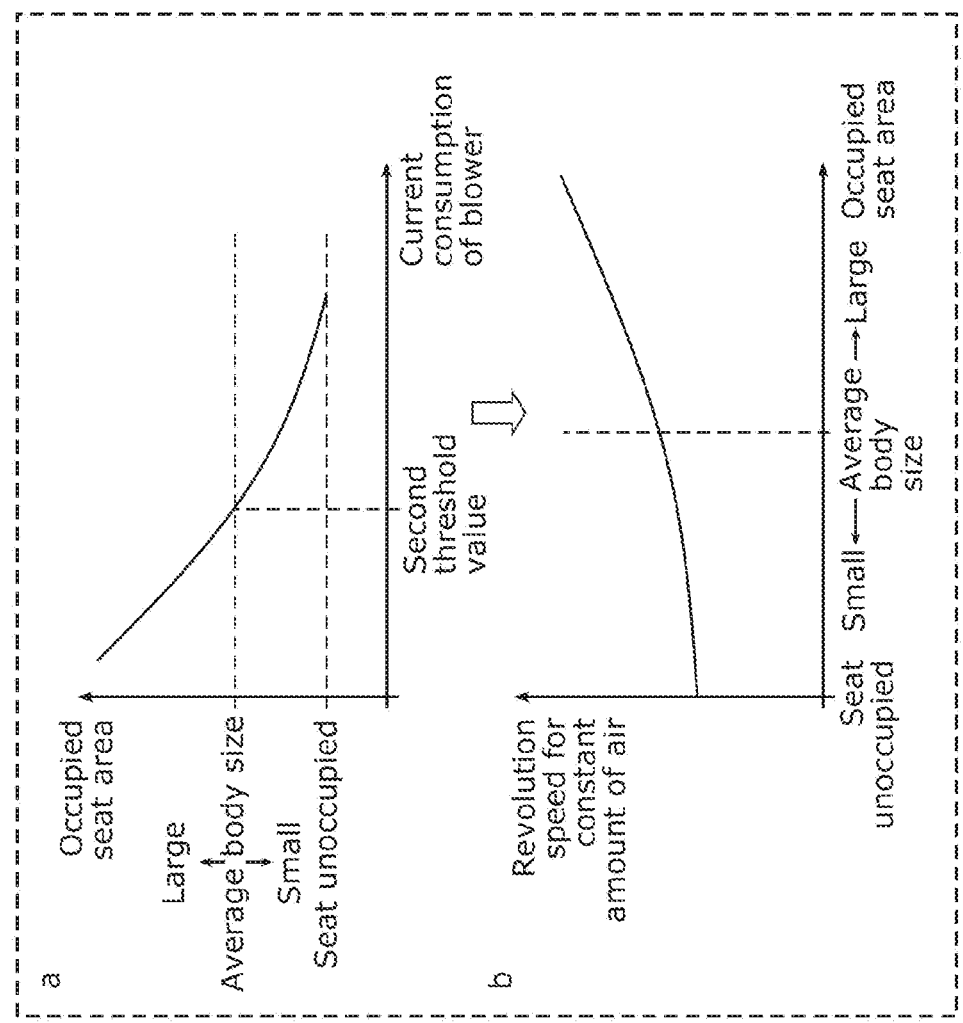
FIG. 10 illustrates an example of a relationship between body size and current consumption of a blower, and an example of a relationship between revolution speed of the blower and body size.

More specifically, controller 60 determines from the calculated value whether the body size of the occupant is smaller or larger than the average body size, based on the correlation graph illustrated in a of FIG. 10. From the result of determining the body size of the occupant, controller 60 derives the revolution speed of blower 30 based on the correlation graph illustrated in b of FIG. 10. For example, if the determination result indicates that the occupant has a small body size, controller 60 reduces the revolution speed of blower 30. If the determination result indicates that the occupant has a large body size, controller 60 increases the revolution speed of blower 30. In this way, controller 60 determines the revolution speed of blower 30 that is derived using the correlation graph illustrated in FIG. 10, and controls blower 30 by changing the revolution speed to the determined revolution speed.

To be more specific, the current consumption of blower 30 when the body size of the occupant is "large" is smaller than the current consumption when the body size of the occupant is "average" (this current consumption is referred to as the normal current consumption), as described above. More specifically, the smaller the current consumption of blower 30 is than the second threshold value, the larger the seat occupied area is. In other words, it is determined that the body size of the occupant is "large". Thus, if the current consumption detected by current detection circuit 51 is smaller than the second threshold value, controller 60 determines that the body size of the occupant is "large". By supplying blower 30 with a current more than the normal current consumption, controller 60 controls blower 30 so that the revolution speed becomes higher than the revolution speed provided at the normal current consumption supplied to blower 30. In this way, controller 60 controls the revolution speed of blower 30 so that the amount of air discharged from the front surface of seat 1 to the occupant with "large" body size (the amount of air blown on the occupant) is equal to the amount of air discharged from the front surface of seat 1 to the occupant with average body size.

Furthermore, if the current consumption detected by current detection circuit 51 is substantially equal to the second threshold value, controller 60 determines that the body size of the occupant is "average". Controller 60 controls blower 30 by supplying the normal current consumption to blower 30.

As described above, the greater the current consumption of blower 30 is than the second threshold value as compared with the normal current consumption of blower 30, the smaller the seat occupied area is. In other words, it is determined that the body size of the occupant is "small". Thus, if the current consumption detected by current detection circuit 51 is greater than the second threshold value, controller 60 determines that the body size of the occupant is "small". Here, if the current consumption of blower 30 is greater than the second threshold value and also exceeds the seat-occupancy determination value greater than the second threshold value, controller 60 may determine that the seat is unoccupied. By supplying blower 30 with a current less than the normal current consumption, controller 60 controls blower 30 so that the revolution speed becomes lower than the revolution speed at the normal current consumption supplied to blower 30. In this way, controller 60 controls the revolution speed of blower 30 so that the amount of air discharged from the front surface of seat 1 to the occupant with "small" body size is equal to the amount of air discharged from the front surface of seat 1 to the occupant with average body size.

Next, controller 60 controls blower 30 at the revolution speed changed in Step S42 for a predetermined period (S43).

Then, controller 60 returns to Step S42.

Note that an operation performed by the occupant using the operation panel included in vehicle 2 can freely stop the driving of vehicle seat air-conditioning device 3 in any step.

Operation Example 2

Figure 11:
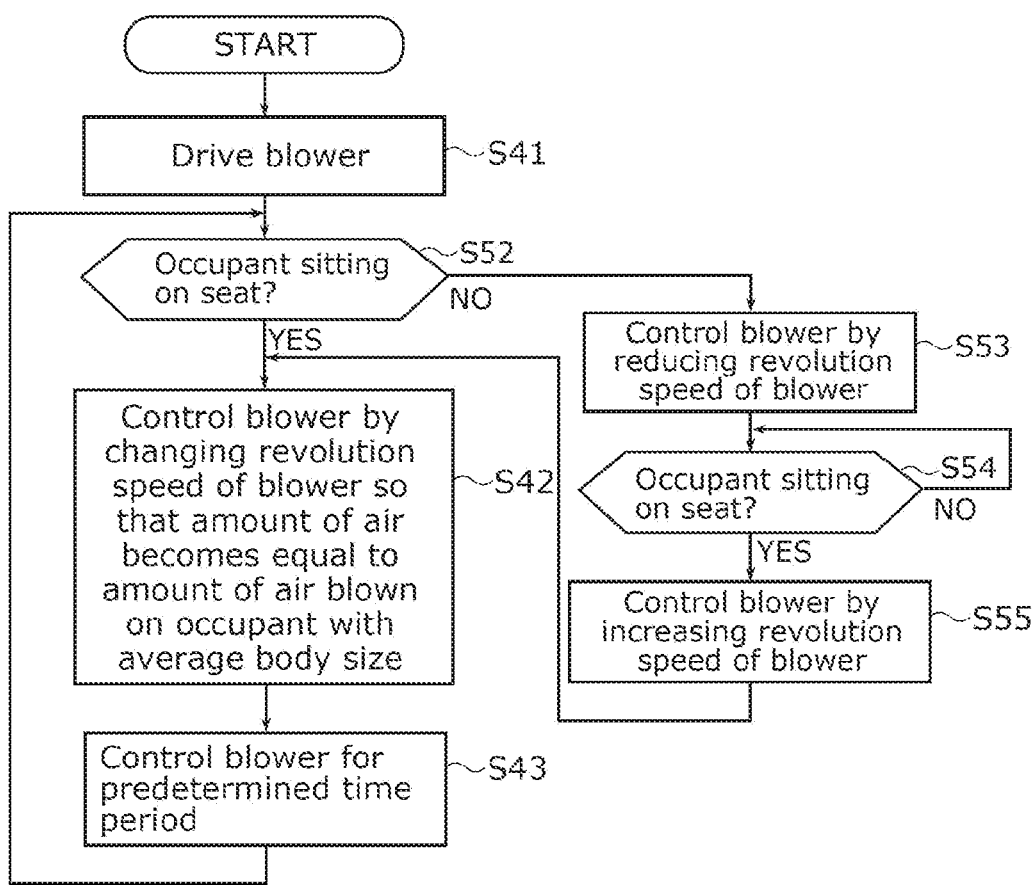
FIG. 11 is a flowchart of operation example 2 performed by the vehicle seat air-conditioning device according to Embodiment 2.

FIG. 11 is a flowchart of operation example 2 performed by vehicle seat air-conditioning device 3 according to Embodiment 2. Processes of operation example 2 that are identical to those of operation example 1 in FIG. 9 are assigned reference marks identical to those used in FIG. 9, and thus descriptions on these processes are omitted as appropriate.

Controller 60 of vehicle seat air-conditioning device 3 drives blower 30 in response to an operation instruction received by the operation panel (S41).

Next, controller 60 obtains the information indicating the current consumption from current detection circuit 51 and determines, based on the current consumption indicated in the obtained information, whether the occupant is sitting on the seat (S52). To be more specific, controller 60 determines whether the current consumption is smaller than the seat-occupancy determination value.

If determining that the current consumption is smaller than the seat-occupancy determination value, or more specifically, if determining that the occupant is sitting on seat 1 (YES in S52), controller 60 calculates a value by subtracting the second threshold value from the current consumption currently detected. Then, based on the calculated value, controller 60 controls blower 30 by changing the revolution speed of blower 30 so that the amount of air becomes equal to the amount of air blown on the occupant with average body size (S42).

After Step S43, controller 60 returns to Step S52.

In contrast, if determining that the current consumption is greater than or equal to the seat-occupancy determination value, or more specifically, if determining that the occupant is not sitting on seat 1 (NO in S52), controller 60 controls blower 30 by reducing the revolution speed of blower 30 (S53). As a result, the reduction of the current consumption of blower 30 by controller 60 puts vehicle seat air-conditioning device 3 into the energy-saving mode.

After Step S53, controller 60 obtains the information indicating the current consumption from current detection circuit 51. Then, based on the current consumption indicated in the obtained information, controller 60 determines again whether the occupant is sitting on the seat (S54).

If determining that the current consumption is greater than or equal to the seat-occupancy determination value, or more specifically, if determining that the occupant is not sitting on seat 1 (NO in S54), controller 60 controls blower 30 so that the energy-saving mode is maintained.

In contrast, if determining that the current consumption is smaller than the seat-occupancy determination value, or more specifically, if determining that the occupant is sitting on seat 1 (YES in S54), controller 60 controls blower 30 so that the revolution speed of blower 30 is increased from the lower revolution speed (S55). As a result, vehicle seat air-conditioning device 3 is put into a normal mode in which blower 30 is controlled so that the revolution speed is equal to the revolution speed provided when the occupant with average body size is sitting on seat 1. Then, controller 60 proceeds to Step S42.

Note that an operation performed by the occupant using the operation panel included in vehicle 2 can freely stop the driving of vehicle seat air-conditioning device 3 in any step.

Operation Example 3

Figure 12:
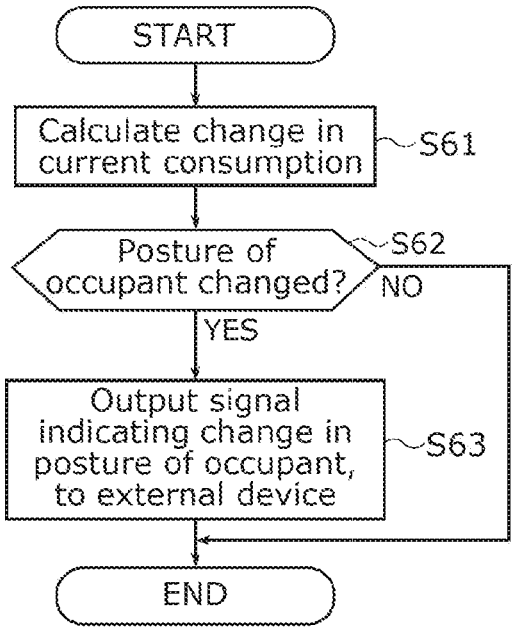
FIG. 12 is a flowchart of operation example 3 performed by the vehicle seat air-conditioning device according to Embodiment 2.

FIG. 12 is a flowchart of operation example 3 performed by vehicle seat air-conditioning device 3 according to Embodiment 2.

Controller 60 obtains the information indicating the current consumption from current detection circuit 51 at predetermined intervals. Then, controller 60 calculates a change in the obtained current consumption (S61).

Next, controller 60 determines whether the posture of the occupant sitting on seat 1 has changed, based on the calculated change in the current consumption (S62). To be more specific, controller 60 calculates the change in the current consumption detected by current detection circuit 51 from when the occupant sat on seat 1. For example, controller 60 calculates an amount of change between the current consumption obtained at a first time point and the current consumption obtained at a second time point that is later than the first time point. The amount of change refers to a difference or a rate of change between the current consumption at the first time point and the current consumption at the second time point, for example. Controller 60 determines whether the posture of the occupant sitting on seat 1 has changed by determining whether the calculated amount of change between these current consumptions is greater than or equal to a specified value.

If the amount of change in the posture of the occupant sitting on seat 1 is greater than or equal to the specified value, controller 60 determines that the posture of the occupant sitting on seat 1 has changed (YES in S62).

Next, controller 60 outputs the posture change signal indicating the change in the posture of the occupant to the external device (S63). Then, controller 60 ends the flowchart in FIG. 12.

Here, description returns back to Step S62. In contrast, if the amount of change in the posture of the occupant sitting on seat 1 is smaller than the specified value, controller 60 determines that the posture of the occupant sitting on seat 1 has not changed (NO in S62). Then, controller 60 ends the flowchart in FIG. 12.

Note that controller 60 may output a signal indicating no change in the posture of the occupant to the external device.

Operation Example 4

Figure 13:
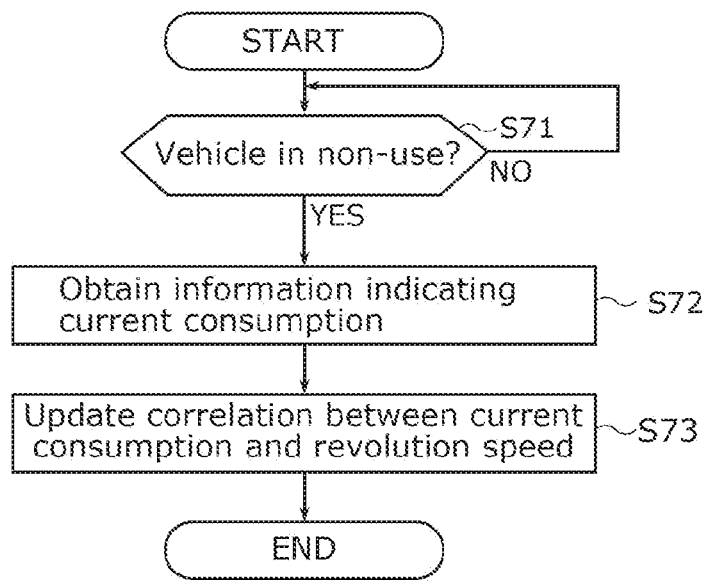
FIG. 13 is a flowchart of operation example 4 performed by the vehicle seat air-conditioning device according to Embodiment 2.

FIG. 13 is a flowchart of operation example 4 performed by vehicle seat air-conditioning device 3 according to Embodiment 2.

Controller 60 determines whether vehicle 2 is in non-use (S71). For example, controller 60 determines whether vehicle 2 is in non-use by determining whether the engine switch is OFF. If the engine switch is OFF, vehicle 2 is in non-use. In this case, it is generally determined that the occupant is not sitting on seat 1.

If vehicle 2 is in use (NO in S71), controller 60 returns to Step S71.

Next, if vehicle 2 is in non-use (YES in S71), controller 60 drives blower 30 in the standard mode and thereby obtains, from current detection circuit 51, the information indicating the current consumption of blower 30 driven when vehicle 2 is in non-use or when a door of vehicle 2 in non-use is unlocked (S72).

Controller 60 calculates the revolution speed of blower 30 driven when the occupant is not sitting on seat 1, based on the current consumption of blower 30 driven when the occupant is not sitting on seat 1 of vehicle 2 that is stationary and thus vehicle 2 is in non-use or when a door of vehicle 2 in non-use is unlocked (that is, based on the obtained information indicating the current consumption described above). Controller 60 updates the correlation, previously stored in storage 80, between current consumption and revolution speed, with the current consumption and the revolution speed of blower 30 driven when vehicle 2 is in non-use or when a door of vehicle 2 in non-use is unlocked. Then, controller 60 stores this correlation into storage 80. In this way, controller 60 corrects the information that indicates the correlation between current consumption and revolution speed and that is used for controlling the revolution speed based on the current consumption indicated in the obtained information. For a correction in the case of clogging caused to inlet duct 31 or outlet duct 32 for instance, the graph or the second threshold value in a of FIG. 10 is shifted to the left and the graph in b of FIG. 10 is shifted upward.

Next, by storing the current consumption of blower 30 as indicated in the information when vehicle 2 is in non-use or when a door of vehicle 2 in non-use is unlocked as the second threshold value into storage 80, controller 60 updates the second threshold value to the current consumption of blower 30 driven when vehicle 2 is in non-use or when a door of vehicle 2 in non-use is unlocked (S73). More specifically, controller 60 updates the initial value previously stored in storage 80. Then, controller 60 ends the flowchart in FIG. 13.

Here, even when the engine switch is OFF, the occupant may be sitting on seat 1 on occasion. In this case, controller 60 may inform that vehicle seat air-conditioning device 3 is to be driven, via a display device included in vehicle 2 for example.

Operation Example 5

The present operation example describes the case where whether a door of vehicle 2 in non-use is unlocked is determined.

Figure 14:
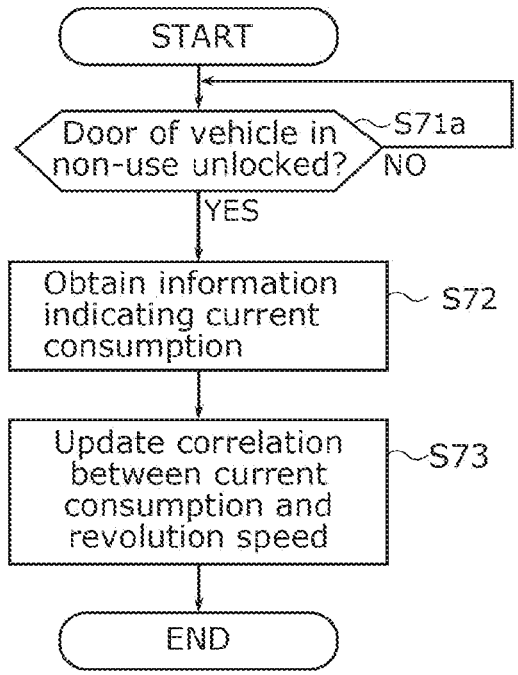
FIG. 14 is a flowchart of operation example 5 performed by the vehicle seat air-conditioning device according to Embodiment 2.

FIG. 14 is a flowchart of operation example 5 performed by vehicle seat air-conditioning device 3 according to Embodiment 2. Processes in the present operation example that are identical to those in FIG. 13 are assigned reference marks identical to those used in FIG. 13, and thus descriptions on these processes are omitted as appropriate.

Controller 60 determines whether a door of vehicle 2 in non-use is unlocked (S71a). For example, controller 60 determines whether vehicle 2 is in non-use by determining whether the engine switch is OFF. Furthermore, controller 60 determines whether a door of vehicle 2 is unlocked by determining whether a lock-unlock signal indicating that a door of vehicle 2 is unlocked is obtained from a door lock-unlock sensor included in vehicle 2. Note that whether the door is unlocked may be determined by determining whether a door unlock operation is performed using a key to vehicle 2.

If determining that a door of vehicle 2 in non-use is not unlocked (NO in S71a), controller 60 returns to Step S71a.

Next, if determining that a door of vehicle 2 in non-use is unlocked (YES in S71a), controller 60 drives blower 30 in the standard mode and thereby obtains, from current detection circuit 51, the information indicating the current consumption of blower 30 driven when vehicle 2 is in non-use or when a door of vehicle 2 in non-use is unlocked (S72).

Next, by storing the current consumption of blower 30 in this information when vehicle 2 is in non-use or when a door of vehicle 2 in non-use is unlocked as the first threshold value into storage 80, controller 60 updates the first threshold value to the current consumption of blower 30 driven when vehicle 2 is in non-use or when a door of vehicle 2 in non-use is unlocked (S73). Then, controller 60 ends the flowchart in FIG. 14. After this, vehicle seat air-conditioning device 3 moves to the operation of the flowchart illustrated in FIG. 9 or FIG. 11.

<Function Effects>

Next, function effects of vehicle seat air-conditioning device 3 according to the present embodiment are described.

As described above, controller 60 of vehicle seat air-conditioning device 3 according to the present embodiment controls a revolution speed of the blower, based on the current consumption detected by current detection circuit 51.

For example, if inlet 31a of inlet duct 31 or outlet 32a of outlet duct 32 is covered by the occupant sitting on seat 1, the amount of air passing through inlet 31a or outlet 32a is likely to decrease. When the revolution speed of blower 30 is constant, the decreased amount of air passing through inlet 31a or outlet 32a causes the current consumption of blower 30 to decrease as well. This is because a workload of blower 30 is reduced by decrease in atmospheric pressure between blower 30 and inlet 31a covered or outlet 32a covered, or more specifically, by decrease in resistance between the air and a propeller of blower 30.

If the current consumption detected by current detection circuit 51 is small, this is because at least one of inlet 31a or outlet 32a is covered by the occupant with large body size and thus the amount of air passing through inlet 31a or outlet 32a decreases as compared with the case where the occupant with average body size is sitting on seat 1. If the current consumption detected by current detection circuit 51 is large, this is because at least one of inlet 31a or outlet 32a is covered by the occupant with small body size and thus the amount of air passing through inlet 31a or outlet 32a increases as compared with the case where the occupant with average body size is sitting on seat 1.

Here, if the current consumption detected is smaller than the current consumption detected when the occupant with average body size is sitting on seat 1, the amount of air from blower 30 decreases. In response, controller 60 according to the present disclosure can perform control to increase the revolution speed of blower 30. Furthermore, if the current consumption detected is larger than the current consumption detected when the occupant with average body size is sitting on seat 1, the amount of air from blower 30 increases. In response, controller 60 can perform control to decrease the revolution speed of blower 30.

Thus, vehicle seat air-conditioning device 3 can provide the occupant with comfort by blowing an appropriate amount of air on the occupant.

Furthermore, controller 60 of vehicle seat air-conditioning device 3 according to the present embodiment controls blower 30 so that the smaller the current consumption is than a second threshold value, the higher the revolution speed is. Moreover, controller 60 controls blower 30 so that the greater the current consumption of blower 30 is than the second threshold value, the lower the revolution speed is.

With this, controller 60 can control blower 30 to increase the revolution speed along with decrease of the current consumption from the current consumption detected when the occupant with average body size is sitting on seat 1. Furthermore, controller 60 can control blower 30 to decrease the revolution speed along with increase of the current consumption from the current consumption detected when the occupant with average body size is sitting on seat 1. Thus, a more appropriate amount of air blown on the occupant can provide the occupant with more comfort.

Furthermore, controller 60 of vehicle seat air-conditioning device 3 according to the present embodiment controls blower 30 so that a constant amount of air is discharged from the surface of seat 1 regardless of a state of the occupant sitting on seat 1.

With this, regardless of the body size or the posture that indicates the state of the occupant, the constant amount of air can be discharged from the surface of seat 1. Thus, a more appropriate amount of air blown on the occupant can provide the occupant with more comfort.

Furthermore, controller 60 of vehicle seat air-conditioning device 3 according to the present embodiment determines, based on the current consumption, a body size of the occupant sitting on seat 1, and outputs a signal indicating the body size of the occupant as a determination result to an external device.

With this, if the current consumption detected by current detection circuit 51 is small, controller 60 determines that the occupant with large body size is sitting on seat 1. Furthermore, if the current consumption detected by current detection circuit 51 is large, controller 60 determines that the occupant with small body size is sitting on seat 1.

Furthermore, controller 60 can output the signal indicating the body size of the occupant to the external device. If the external device is a vehicle electronic control unit (vehicle ECU) for instance, the vehicle ECU receives the signal indicating the body size of the occupant and thereby can control the orientation of an imaging device so that the imaging device faces the direction in which the face of the occupant is assumed to be located.

Furthermore, controller 60 of vehicle seat air-conditioning device 3 according to the present embodiment determines, based on a change in the current consumption, whether a posture of the occupant sitting on seat 1 has changed, and outputs a signal indicating a change in the posture of the occupant as a determination result to the external device.

With this, if the amount of change in the current consumption detected by current detection circuit 51 is large, controller 60 determines that the posture of the occupant is relaxed. Furthermore, if the amount of change in the current consumption detected by current detection circuit 51 is small, controller 60 determines that the occupant is sitting up straight on seat 1.

Furthermore, if the external device is a vehicle ECU for instance, the vehicle ECU can control the orientation of an imaging device based on the signal indicating the posture of the occupant so that the imaging device faces the direction in which the face of the occupant is assumed to be located.

Furthermore, vehicle seat air-conditioning device 3 according to the present embodiment further includes a voltage detection circuit that detects a drive voltage of blower 30. Controller 60 corrects a second threshold value corresponding to the current consumption of blower 30, based on the drive voltage detected by voltage detection circuit 52.

With this, the second threshold value can also be corrected, by previously measuring the current consumption of blower 30 based on a change in the applied voltage. Thus, even if the applied voltage changes due to deterioration of a battery for example, the body size or the posture of the occupant can be more accurately determined based on the current consumption.

Furthermore, by driving blower 30 when vehicle 2 is in non-use or when a door of vehicle 2 in non-use is unlocked, controller 60 corrects a correlation between the current consumption and the revolution speed, the correlation being used for controlling the revolution speed based on the current consumption detected by current detection circuit 51.

In this way, even if seat 1 or blower 30 deteriorates over time, the corrected correlation enables the constant amount of air to be provided.

Other Variations Etc.

Although the present disclosure has been described based on the above embodiments and variations, the present disclosure is not limited to the embodiments and variations. Each of the processing units included in the vehicle seat air-conditioning device according to the above-described embodiments and variations may be implemented to a Large Scale Integration (LSI) circuit that is typically an integrated circuit. These integrated circuits may be formed as separate chips, or may be formed as one chip so as to include the entire processing units or part of the processing units.

Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

It should be noted that, in the above-described embodiments and variations, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

Furthermore, all the numerical values indicated in the above are examples for explaining the present disclosure in detail, and do not limit the embodiments and variations of the present disclosure.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

An order of performing the steps in each of the flowcharts is an example for explaining the present disclosure in detail. The steps may be performed in different orders. Different steps among the steps may be performed simultaneously, in other words, in parallel.

In addition, the present disclosure may include embodiments obtained by making various modifications on the above embodiments and variations which those skilled in the art will arrive at, or embodiments obtained by selectively combining the elements and functions disclosed in the above embodiments and variations, without materially departing from the scope of the present disclosure.

FURTHER INFORMATION ABOUT TECHNICAL BACKGROUND TO THIS APPLICATION

The disclosures of the following patent applications including specification, drawings and claims are incorporated herein by reference in their entirety: Japanese Patent Applications No. 2020-213597 filed on Dec. 23, 2020, No. 2020-213638 filed on Dec. 23, 2020, and No. 2021-096865 filed on Jun. 9, 2021, and PCT International Application No. PCT/JP2021/037456 filed on Oct. 8, 2021.

INDUSTRIAL APPLICABILITY

The present disclosure is applicable to a mobile seat or a sofa of a vehicle, for example.

The invention claimed is:

1. A vehicle seat air-conditioning device for use in a vehicle, comprising:
 a blower that is included in a seat;
 at least one of an inlet duct or an outlet duct, through which the blower draws in air from outside of the seat and discharges the air to outside of the seat, the inlet duct being a duct through which the air is led to be drawn in from a surface of the seat by the blower, and the outlet duct being a duct through which the air led by the blower is discharged from a surface of the seat; and
 a controller that is electrically connected to the blower,
 wherein the blower includes an electrical current detection circuit that detects an electrical current consumption which refers to an electrical current consumed by activation of the blower, and
 wherein the controller determines whether an occupant is sitting on the seat, based on the electrical current consumption detected by the electrical current detection circuit.

2. The vehicle seat air-conditioning device according to claim 1,
 wherein, in the determination, when the electrical current consumption is smaller than a first threshold value, the controller determines that the occupant is sitting on the seat.

3. The vehicle seat air-conditioning device according to claim 2,
 wherein when the controller determined that the occupant is sitting on the seat, the controller controls the blower so that a revolution speed of the blower becomes equal to a steady revolution speed.

4. The vehicle seat air-conditioning device according to claim 2,
 wherein, in the determining, when the electrical current consumption is greater than or equal to the first threshold value, the controller determines that the occupant is not sitting on the seat, and
 when the controller determined that the occupant is not sitting on the seat, the controller controls the blower so that a revolution speed of the blower becomes lower than the revolution speed provided when it is determined that the occupant is sitting on the seat.

5. The vehicle seat air-conditioning device according to claim 2,
 wherein, by driving the blower when the vehicle is in non-use or when a door of the vehicle in non-use is unlocked, the controller updates the first threshold value to the electrical current consumption detected by the electrical current detection circuit.

6. The vehicle seat air-conditioning device according to claim 1, further comprising:
 a voltage detection circuit that detects a drive voltage of the blower,
 wherein the controller corrects the electrical current consumption of the blower, based on the drive voltage detected by the voltage detection circuit.

7. The vehicle seat air-conditioning device according to claim 2, further comprising:
 a voltage detection circuit that detects a drive voltage of the blower,
 wherein the controller corrects the first threshold value, based on the drive voltage detected by the voltage detection circuit.

8. The vehicle seat air-conditioning device according to claim 1,
 wherein the electrical current detection circuit further serves as an overcurrent detection circuit of the blower.

9. The vehicle seat air-conditioning device according to claim 1,
 wherein when the electrical current consumption exceeds an upper limit, the controller outputs a warning signal to an external device.

10. The vehicle seat air-conditioning device according to claim 1,
 wherein the inlet duct is provided in each of a center portion and an outer edge portion of a seating surface which is a seating side of the seat and on which the occupant sits.

11. The vehicle seat air-conditioning device according to claim 10,
 wherein the outer edge portion is at least one of a rear portion or a front edge portion of the seating surface.

12. The vehicle seat air-conditioning device according to claim 1,
wherein the controller controls a revolution speed of the blower, based on the electrical current consumption detected by the electrical current detection circuit.

13. The vehicle seat air-conditioning device according to claim 12,
wherein the controller controls the blower so that the smaller the electrical current consumption is than a second threshold value, the higher the revolution speed is, and
the controller controls the blower so that the greater the electrical current consumption is than the second threshold value, the lower the revolution speed is.

14. The vehicle seat air-conditioning device according to claim 12,
wherein the controller controls the blower so that a constant amount of air is discharged from the surface of the seat regardless of a state of the occupant sitting on the seat.

15. The vehicle seat air-conditioning device according to claim 12,
wherein the controller determines, based on the electrical current consumption, a body size of the occupant sitting on the seat, and outputs a signal indicating the body size of the occupant as a determination result to an external device.

16. The vehicle seat air-conditioning device according to claim 15,
wherein the controller determines, based on a change in the electrical current consumption, whether a posture of the occupant sitting on the seat has changed, and outputs a signal indicating the change in the posture of the occupant as a determination result to the external device.

17. The vehicle seat air-conditioning device according to claim 12, further comprising:
a voltage detection circuit that detects a drive voltage of the blower,
wherein the controller corrects a second threshold value corresponding to the electrical current consumption of the blower, based on the drive voltage detected by the voltage detection circuit.

18. The vehicle seat air-conditioning device according to claim 12,
wherein, by driving the blower when the vehicle is in non-use or when a door of the vehicle in non-use is unlocked, the controller corrects a correlation between the electrical current consumption and the revolution speed, the correlation being used for controlling the revolution speed based on the electrical current consumption detected by the electrical current detection circuit.

* * * * *